United States Patent
Kukucka et al.

(10) Patent No.: US 12,434,360 B2
(45) Date of Patent: Oct. 7, 2025

(54) ADVANCED HOLDING APPARATUS

(71) Applicant: Grip Holdings LLC, Brandon, FL (US)

(72) Inventors: Paul Kukucka, Brandon, FL (US); Thomas Stefan Kukucka, Brandon, FL (US)

(73) Assignee: Grip Holdings LLC, Brandon, FL (US)

( * ) Notice: Subject to any disclaimer, the term of this patent is extended or adjusted under 35 U.S.C. 154(b) by 0 days.

(21) Appl. No.: 18/454,641

(22) Filed: Aug. 23, 2023

(65) Prior Publication Data

US 2024/0009815 A1     Jan. 11, 2024

Related U.S. Application Data

(63) Continuation-in-part of application No. 18/162,501, filed on Jan. 31, 2023, which is a continuation-in-part of application No. 17/506,590, filed on Oct. 20, 2021, now Pat. No. 11,602,828, which is a continuation-in-part of application No. 17/224,032, filed on Apr. 6, 2021, now Pat. No. 12,172,270, which is a continuation-in-part of application No. 16/942,658, filed on Jul. 29, 2020, now Pat. No. 10,967,488, which is a continuation-in-part of application No. PCT/IB2019/056500, filed on Jul. 30, (Continued)

(51) Int. Cl.
*B25B 23/00*     (2006.01)
*B25B 15/00*     (2006.01)
*B25B 21/00*     (2006.01)

(52) U.S. Cl.
CPC ........ *B25B 23/0035* (2013.01); *B25B 15/004* (2013.01); *B25B 21/00* (2013.01)

(58) Field of Classification Search
CPC .... B25B 23/0035; B25B 15/004; B25B 21/00
USPC ................................................ 81/53.2, 186
See application file for complete search history.

(56) References Cited

U.S. PATENT DOCUMENTS 1,798,944 A      3/1931   Jackman
2,125,276 A  *   8/1938   Green ................... F16B 39/286
                                                     411/282

(Continued)

FOREIGN PATENT DOCUMENTS

AU      201612229      4/2016
AU      201612720      6/2016

(Continued)

*Primary Examiner* — Hadi Shakeri

(57) ABSTRACT

A screw bit body allows for efficient torque force application onto a socket fastener. The screw bit body includes a plurality of laterally-bracing sidewalls, a first base, and a second base. The laterally-bracing sidewalls are radially distributed about a rotation axis of the screw bit body with each further including a first lateral edge, a second lateral edge, a first bracing surface, a second bracing surface, and an engagement cavity. The engagement cavity creates an additional gripping point to prevent slippage in between the screw bit body and the socket fastener. The engagement cavity traverses normal and into the screw bit body from the first base to the second base. The engagement cavity comprises a protrusion arranged between a first cavity section and a second cavity section.

15 Claims, 31 Drawing Sheets

Related U.S. Application Data 2019, and a continuation-in-part of application No. 16/107,842, filed on Aug. 21, 2018, now Pat. No. 10,780,556, said application No. PCT/IB2019/056500 is a continuation-in-part of application No. 16/107,842, filed on Aug. 21, 2018, now Pat. No. 10,780,556, which is a continuation-in-part of application No. 15/650,768, filed on Jul. 14, 2017, now Pat. No. 10,081,094.

(60) Provisional application No. 62/475,757, filed on Mar. 23, 2017.

(56) References Cited

U.S. PATENT DOCUMENTS

| | | | | |
|---|---|---|---|---|
| 2,440,944 | A * | 5/1948 | Green | F16B 39/286 |
|  |  |  |  | 411/282 |
| 2,969,250 | A | 1/1961 | Kull | |
| 3,405,377 | A | 10/1968 | Pierce | |
| 3,495,485 | A | 2/1970 | Knudsen et al. | |
| 3,902,384 | A | 9/1975 | Ehrler | |
| 3,908,489 | A | 9/1975 | Yamamoto et al. | |
| 3,913,427 | A | 10/1975 | Brase | |
| 4,074,597 | A | 2/1978 | Jansson | |
| 4,361,412 | A | 11/1982 | Stolarczyk | |
| 4,536,115 | A | 8/1985 | Helderman | |
| 4,598,616 | A | 7/1986 | Colvin | |
| 4,607,547 | A | 8/1986 | Martus | |
| 4,651,596 | A | 3/1987 | Rachanski | |
| 4,893,530 | A | 1/1990 | Warheit | |
| 4,927,020 | A | 5/1990 | Randy | |
| 4,930,378 | A | 6/1990 | Colvin | |
| 5,019,080 | A | 5/1991 | Hemer | |
| 5,031,487 | A | 7/1991 | Polonsky | |
| 5,219,392 | A | 6/1993 | Ruzicka et al. | |
| 5,228,570 | A | 7/1993 | Robinson | |
| 5,251,521 | A | 10/1993 | Burda et al. | |
| 5,398,823 | A | 3/1995 | Anders | |
| 5,481,948 | A | 1/1996 | Zerkovitz | |
| 5,501,342 | A | 3/1996 | Geibel | |
| 5,519,929 | A | 5/1996 | Bleckman | |
| 5,645,177 | A | 7/1997 | Lin | |
| 5,649,791 | A | 7/1997 | Connolly | |
| 5,669,516 | A | 9/1997 | Horn | |
| 5,725,107 | A | 3/1998 | Dembicks | |
| 5,737,981 | A | 4/1998 | Hildebrand | |
| 5,743,394 | A | 4/1998 | Martin | |
| 5,782,148 | A | 7/1998 | Kerkhoven | |
| 5,829,327 | A | 11/1998 | Stanton | |
| 5,832,792 | A | 11/1998 | Hsieh | |
| 5,868,049 | A | 2/1999 | Kanwal | |
| 5,873,290 | A | 2/1999 | Chaconas | |
| 5,904,076 | A | 5/1999 | Siwy | |
| 6,009,778 | A | 1/2000 | Hsieh | |
| 6,079,299 | A | 6/2000 | Sundstrom | |
| 6,092,279 | A | 7/2000 | Shoup | |
| 6,352,011 | B1 | 3/2002 | Frühm | |
| 6,431,373 | B1 | 8/2002 | Blick | |
| 6,575,057 | B1 | 6/2003 | Ploeger | |
| 6,626,067 | B1 | 9/2003 | Iwinski | |
| 6,698,316 | B1 | 3/2004 | Wright | |
| 6,729,208 | B1 | 5/2004 | Chrzanowski | |
| 6,755,098 | B2 | 6/2004 | Huang | |
| 6,761,089 | B2 | 7/2004 | Bergamo | |
| 6,857,340 | B2 | 2/2005 | Wagner | |
| 6,951,156 | B2 | 10/2005 | Garg | |
| 7,000,501 | B1 | 2/2006 | Chen | |
| D524,615 | S | 7/2006 | Albertson | |
| 7,137,514 | B1 | 11/2006 | Nickipuck | |
| 7,225,710 | B2 * | 6/2007 | Pacheco, Jr. | B25B 15/008 |
|  |  |  |  | 81/436 |
| 7,331,260 | B2 | 2/2008 | Cheng | |
| 7,434,494 | B1 | 10/2008 | Snider | |
| D614,931 | S | 5/2010 | Su | |
| 7,717,278 | B2 | 5/2010 | Kao | |
| 7,788,994 | B2 | 9/2010 | Wright et al. | |
| 7,814,814 | B2 | 10/2010 | Whitehead | |
| 7,841,480 | B2 | 11/2010 | Hsieh | |
| 7,913,593 | B2 | 3/2011 | Dahar et al. | |
| 8,166,851 | B2 | 5/2012 | Pchola | |
| 8,302,255 | B2 | 11/2012 | Lin | |
| 8,336,709 | B1 | 12/2012 | Geibel | |
| 9,132,533 | B2 | 9/2015 | Lesche et al. | |
| D745,814 | S | 12/2015 | Hsieh | |
| D776,505 | S | 1/2017 | Doroslovac | |
| D784,106 | S | 4/2017 | Doroslovac | |
| 9,687,968 | B2 | 6/2017 | Doroslovac et al. | |
| D794,405 | S | 8/2017 | Doroslovac et al. | |
| 9,718,170 | B2 | 8/2017 | Eggert et al. | |
| D798,682 | S | 10/2017 | Doroslovac et al. | |
| 9,873,195 | B1 | 1/2018 | Buxton | |
| 9,878,441 | B1 | 1/2018 | Kao | |
| D829,069 | S | 9/2018 | Doroslovac et al. | |
| 10,081,094 | B2 | 9/2018 | Doroslovac et al. | |
| 10,100,864 | B2 * | 10/2018 | Rathmann | F16B 23/003 |
| 10,328,554 | B2 | 6/2019 | Todd | |
| D859,944 | S | 9/2019 | Kukucka et al. | |
| D859,945 | S | 9/2019 | Kukucka et al. | |
| D859,946 | S | 9/2019 | Kukucka et al. | |
| D859,947 | S | 9/2019 | Kukucka et al. | |
| D867,841 | S | 11/2019 | Kukucka et al. | |
| D868,553 | S | 12/2019 | Kukucka et al. | |
| 10,493,519 | B2 | 12/2019 | Ross | |
| D879,577 | S | 3/2020 | Kukucka et al. | |
| D880,968 | S | 4/2020 | Kukucka et al. | |
| D880,977 | S | 4/2020 | Kukucka et al. | |
| D885,149 | S | 5/2020 | Kukucka et al. | |
| D887,233 | S | 6/2020 | Kukucka et al. | |
| D887,711 | S | 6/2020 | Kukucka et al. | |
| D889,224 | S | 7/2020 | Kukucka et al. | |
| D889,257 | S | 7/2020 | Kukucka et al. | |
| D892,578 | S | 8/2020 | Kukucka et al. | |
| 10,780,556 | B2 | 9/2020 | Kukucka et al. | |
| 10,786,890 | B2 | 9/2020 | Kukucka et al. | |
| D899,091 | S | 10/2020 | Kukucka et al. | |
| 10,828,766 | B2 | 11/2020 | Kukucka et al. | |
| D904,152 | S | 12/2020 | Kukucka et al. | |
| D906,781 | S | 1/2021 | Kukucka et al. | |
| 10,882,162 | B2 | 1/2021 | Kukucka et al. | |
| D909,842 | S | 2/2021 | Kukucka et al. | |
| D910,490 | S | 2/2021 | Lim et al. | |
| 10,919,133 | B2 | 2/2021 | Kukucka et al. | |
| 10,960,520 | B2 * | 3/2021 | Schulz | B25B 15/008 |
| 10,967,488 | B2 | 4/2021 | Kukucka et al. | |
| 11,045,925 | B2 | 6/2021 | Kukucka et al. | |
| 11,154,969 | B2 | 10/2021 | Kukucka et al. | |
| 2003/0209111 | A1 | 11/2003 | Huang | |
| 2004/0256263 | A1 | 12/2004 | Shih | |
| 2005/0098459 | A1 | 5/2005 | Gorman | |
| 2005/0103664 | A1 | 5/2005 | Shih | |
| 2005/0183548 | A1 | 8/2005 | Horobec | |
| 2005/0194330 | A1 | 9/2005 | Ziske | |
| 2005/0257357 | A1 | 11/2005 | Huang | |
| 2005/0274233 | A1 | 12/2005 | Lin | |
| 2006/0130618 | A1 | 6/2006 | Hsieh | |
| 2006/0156869 | A1 * | 7/2006 | Hsieh | B25B 13/065 |
|  |  |  |  | 81/121.1 |
| 2006/0266168 | A1 | 11/2006 | Pacheco, Jr. | |
| 2007/0005070 | A1 | 1/2007 | Kay et al. | |
| 2007/0261519 | A1 | 11/2007 | Cheng | |
| 2008/0235930 | A1 | 10/2008 | English | |
| 2009/0007732 | A1 * | 1/2009 | Hsieh | B25B 13/04 |
|  |  |  |  | 81/177.85 |
| 2009/0120885 | A1 | 5/2009 | Kao | |
| 2009/0220321 | A1 | 9/2009 | Sakamura | |
| 2010/0064863 | A1 | 3/2010 | Kozak | |
| 2010/0065520 | A1 | 3/2010 | Hsieh | |
| 2011/0056339 | A1 | 3/2011 | Su | |
| 2011/0303052 | A1 | 12/2011 | Chen | |
| 2012/0060656 | A1 | 3/2012 | Chang | |
| 2012/0132039 | A1 | 5/2012 | Su | |
| 2013/0047798 | A1 | 2/2013 | Huang | |
| 2013/0213193 | A1 | 8/2013 | Lukes | |

(56) References Cited

U.S. PATENT DOCUMENTS

| | | |
|---|---|---|
| 2013/0263706 A1 | 10/2013 | Safar |
| 2014/0260832 A1 | 9/2014 | Hsiao |
| 2014/0311302 A1 | 10/2014 | Taguchi et al. |
| 2014/0331826 A1 | 11/2014 | Campbell |
| 2014/0360321 A1 | 12/2014 | Steinweg et al. |
| 2015/0135910 A1 | 5/2015 | Eggert et al. |
| 2015/0266169 A1 | 9/2015 | Campbell, II |
| 2015/0314429 A1 | 11/2015 | Doroslovac |
| 2015/0321332 A1 | 11/2015 | Lee |
| 2016/0046008 A1 | 2/2016 | Thomas |
| 2016/0067853 A1 | 3/2016 | Neto |
| 2016/0136792 A1 | 5/2016 | Harp |
| 2016/0223005 A1 | 8/2016 | Rathmann |
| 2016/0271764 A1 | 9/2016 | Huang |
| 2016/0339564 A1 | 11/2016 | Chen |
| 2017/0028538 A1 | 2/2017 | Lourenco et al. |
| 2017/0246733 A1 | 8/2017 | Shehab |
| 2017/0252905 A1 | 9/2017 | Doroslovac |
| 2017/0282337 A1 | 10/2017 | Johnson et al. |
| 2017/0312839 A1 | 11/2017 | Moss et al. |
| 2017/0312897 A1 | 11/2017 | Doroslovac et al. |
| 2018/0001450 A1 | 1/2018 | Anderson |
| 2018/0003241 A1 | 1/2018 | Goss |
| 2018/0141192 A1 | 5/2018 | Chang |
| 2018/0354022 A1 | 12/2018 | Ross et al. |
| 2018/0354102 A1 | 12/2018 | Kukucka et al. |
| 2019/0001469 A1 | 1/2019 | Cho et al. |
| 2019/0015961 A1 | 1/2019 | Kukucka et al. |
| 2019/0152033 A1 | 5/2019 | Kukucka et al. |
| 2019/0217449 A1 | 7/2019 | Lee |
| 2019/0283233 A1 | 9/2019 | Kukucka et al. |
| 2019/0337131 A1 | 11/2019 | Kukucka et al. |
| 2019/0375077 A1 | 12/2019 | Kukucka et al. |
| 2020/0039034 A1 | 2/2020 | Kukucka |
| 2020/0070321 A1 | 3/2020 | Schulz |
| 2020/0078908 A1 | 3/2020 | Wu et al. |
| 2020/0269398 A1 | 8/2020 | Donovan |
| 2020/0298380 A1 | 9/2020 | Doroslovac et al. |
| 2020/0376648 A1 | 12/2020 | Kukucka et al. |
| 2020/0391360 A1 | 12/2020 | Kukucka et al. |
| 2021/0039245 A1 | 2/2021 | Kukucka et al. |
| 2021/0148395 A1 | 5/2021 | Kukucka et al. |
| 2022/0040830 A1 | 2/2022 | Kukucka et al. |

FOREIGN PATENT DOCUMENTS

| | | |
|---|---|---|
| AU | 201612721 | 6/2016 |
| CA | 2564093 A1 | 4/2007 |
| CA | 168071 | 12/2016 |
| CA | 2898480 A1 | 7/2017 |
| CA | 3056534 A1 | 9/2018 |
| CN | 2767068 Y | 3/2006 |
| CN | 3630254 | 6/2006 |
| CN | 201046555 Y | 4/2008 |
| CN | 101208181 A | 6/2008 |
| CN | 102395447 | 3/2012 |
| CN | 102554833 A | 7/2012 |
| CN | 103639950 A | 3/2014 |
| CN | 303924849 | 11/2016 |
| CN | 303956827 | 12/2016 |
| CN | 303984883 | 12/2016 |
| CN | 207548606 U | 6/2018 |
| DE | 3911409 A1 | 10/1990 |
| DE | 9403220 U1 | 4/1994 |
| DE | 4321325 A1 | 1/1995 |
| DE | 29613327 U1 | 9/1996 |
| DE | 10321284 A1 | 12/2004 |
| DE | 202010006146 U1 | 7/2010 |
| DE | 202012103034 | 11/2012 |
| DE | 102012104298 A1 | 11/2013 |
| DE | 102013021238 A1 | 6/2015 |
| EP | 0930132 A2 | 7/1999 |
| EP | 0930132 A3 | 11/2000 |
| EP | 1371453 A2 | 12/2003 |
| EP | 1731774 A1 | 12/2006 |
| EP | 0930132 B1 | 4/2007 |
| EP | 2363245 | 9/2011 |
| EP | 2363245 A2 | 9/2011 |
| EP | 2363245 A3 | 7/2015 |
| GB | 906839 A | 9/1962 |
| GB | 1294764 A | 11/1972 |
| GB | 2366532 A | 3/2002 |
| JP | H06-15580 | 1/1994 |
| JP | H 6159339 | 4/1995 |
| JP | 2011143522 | 7/2011 |
| JP | 2012157913 | 10/2011 |
| JP | 2014100742 | 6/2014 |
| JP | 2015180835 A | 7/2017 |
| JP | 2020128007 | 8/2020 |
| KR | 200149097 Y1 | 7/1999 |
| RU | 2152870 C1 | 7/2000 |
| RU | 2225786 C2 | 1/2001 |
| RU | 45671 U1 | 5/2005 |
| RU | 58510 U1 | 11/2006 |
| RU | 2387533 C1 | 4/2010 |
| RU | 116398 | 5/2012 |
| RU | 180548 U1 | 6/2018 |
| SU | 16616 A1 | 8/1930 |
| TW | 201341127 A | 10/2013 |
| TW | 201617181 A | 5/2016 |
| WO | 1994016862 A1 | 8/1994 |
| WO | 1996010932 A1 | 4/1996 |
| WO | 1996026870 A1 | 9/1996 |
| WO | 1996027745 A1 | 9/1996 |
| WO | 1997010926 A1 | 3/1997 |
| WO | 1998012982 A1 | 4/1998 |
| WO | 999032264 | 7/1999 |
| WO | 1999032264 A1 | 7/1999 |
| WO | 2001066312 A1 | 9/2001 |
| WO | 2004002687 A1 | 1/2004 |
| WO | 2005070621 | 8/2005 |
| WO | 2006023374 | 3/2006 |
| WO | 2006130490 A1 | 12/2006 |
| WO | 2010007402 A1 | 1/2010 |
| WO | 2011109040 A1 | 9/2011 |
| WO | 2013028875 A1 | 2/2013 |
| WO | 2015082283 A1 | 6/2015 |
| WO | 2015050942 A1 | 9/2015 |
| WO | 2016051080 A1 | 4/2016 |
| WO | DM/090809 | 4/2016 |
| WO | DM/091188 | 5/2016 |
| WO | DM/091189 | 5/2016 |
| WO | 2016174615 A1 | 11/2016 |
| WO | WO2017069953 A1 | 4/2017 |
| WO | 2017178997 | 10/2017 |
| WO | 2017187388 A1 | 11/2017 |
| WO | 2018150360 A1 | 8/2018 |
| WO | 2018172831 | 9/2018 |
| WO | 2019012486 | 1/2019 |
| WO | 2019167032 | 9/2019 |
| WO | 2019175652 | 9/2019 |
| WO | 2020039281 | 2/2020 |
| WO | 2020039285 | 2/2020 |
| WO | 2020058777 | 3/2020 |
| WO | 2020152516 | 7/2020 |
| WO | 2020208608 | 10/2020 |
| WO | 2020225800 | 11/2020 |
| WO | 2021001696 | 1/2021 |
| WO | 2021019500 | 2/2021 |
| WO | 2021033152 | 2/2021 |
| WO | 2022047236 A1 | 3/2022 |
| WO | 2022103566 A1 | 5/2022 |

\* cited by examiner

ADVANCED HOLDING APPARATUS

FIELD OF THE INVENTION

The present invention generally relates to various tools designed for tightening or loosening fasteners, in particular bolts and nuts. More specifically, the present invention is an anti-slip multidirectional driver bit, designed to prevent damaging or stripping fasteners during the extraction or tightening process.

BACKGROUND OF THE INVENTION

Hex bolts, nuts, screws, and other similar threaded devices are used to secure and hold multiple components together by being engaged to a complimentary thread, known as a female thread. The general structure of these types of fasteners is a cylindrical shaft with an external thread and a head at one end of the shaft. The external thread engages a complimentary female thread tapped into a hole or a nut and secures the fastener in place, fastening the associated components together. The head receives an external torque force and is the means by which the fastener is turned, or driven, into the female threading. The head is shaped specifically to allow an external tool like a wrench to apply a torque to the fastener in order to rotate the fastener and engage the complimentary female threading to a certain degree. This type of fastener is simple, extremely effective, cheap, and highly popular in modern construction.

One of the most common problems in using these types of fasteners, whether male or female, is the tool slipping in the head portion, or slipping on or off the head portion. This is generally caused by either a worn fastener or tool, corrosion, overtightening, or damage to the head portion of the fastener. The present invention is a driving bit design that virtually eliminates slippage. The design uses a series of segmented portions that bite into the head of the fastener and allow for efficient torque transfer between the driving bit and the head portion of the fastener. The present invention eliminates the need for the common bolt extractors as they require unnecessary drilling and tools. With the development of electric screwdrivers, and drills, people have been using, power tools to apply the required torsional forces and remove various fasteners. The present invention provides for a single or double-sided driver end bit, thus allowing for torque to applied to the fastener in both clockwise and counterclockwise directions, thus tightening or loosening the fastener. Most driver end bits have a standardized one fourth inch hex holder and come in various configurations including but not limited to, square end, hex end, or star end.

DETAIL DESCRIPTIONS OF THE INVENTION

All illustrations of the drawings are for the purpose of describing selected versions of the present invention and are not intended to limit the scope of the present invention.

The present invention generally related to torque tool accessories. More specifically, the present invention is a multi-grip screw bit, also known as a screw bit or driver. The present invention allows for a higher torque to be applied to a fastener than a similarly sized conventional driver bit without damaging the head of the fastener or the bit tool. This is achieved through the use of a multitude of engagement features which effectively grip the head of the fastener. The present invention is a screw bit that is compatible with a variety of torque tools including, but not limited to, traditional drills, bit-receiving screwdrivers, socket wrenches, and socket drivers.

Figure 1:
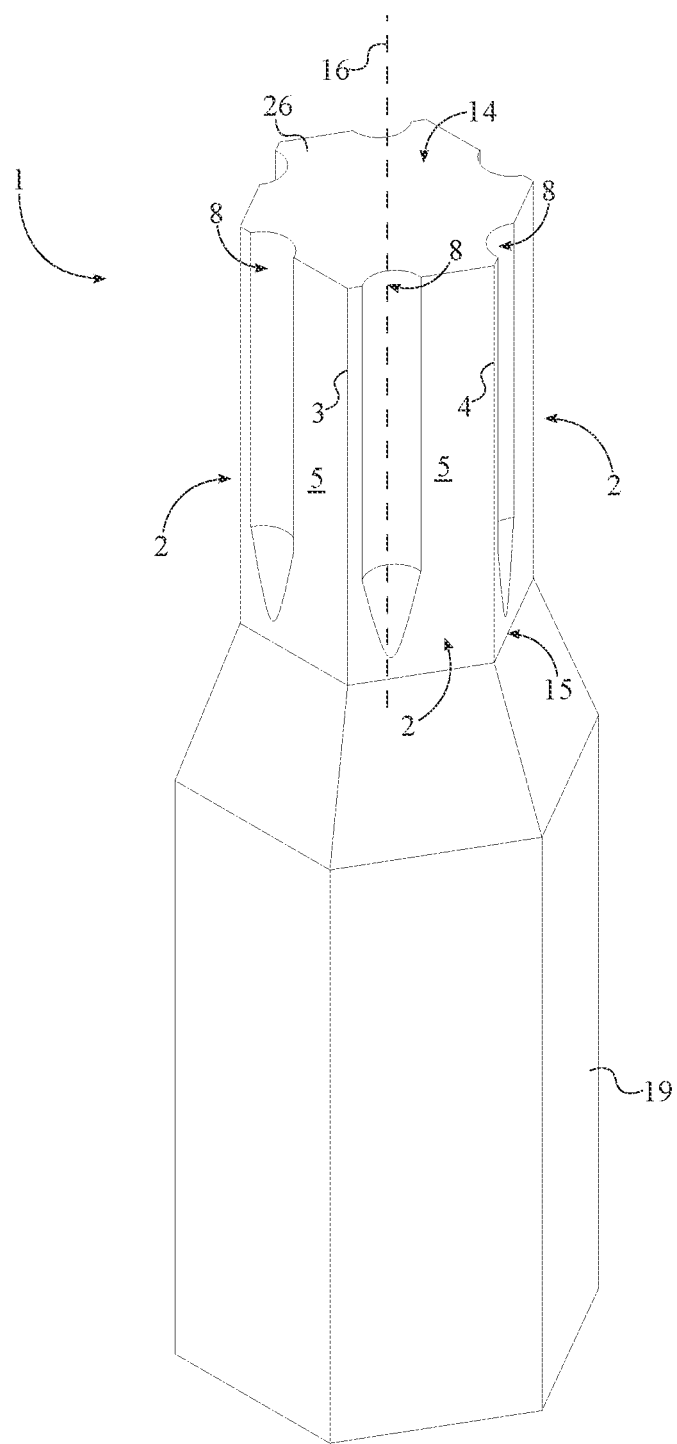
FIG. 1 is a perspective view of the present invention.

In its simplest embodiment, referring to FIG. 1, the present invention comprises an at least one screw bit body 1 and an attachment body 19. The screw bit body 1 is a shank which engages the socket fastener, such as a socket screw or a socket bolt, in order to apply a torque force onto the socket faster. The screw bit body 1 comprises a plurality of laterally-bracing sidewalls 2, a first base 14, a second base 15, and at least one engagement cavity 8. The at least one engagement cavity 8 is a generally lateral cut into the at least one screw bit body 1 that helps to distribute torsional forces applied during the preferred usage of the present invention in order to maximize efficiency and minimize wear. In general, the screw bit body 1 is a prism composed of a strong metal. Each of the plurality of laterally-bracing sidewalls 2 engage within and grip the socket fastener in order to efficiently transfer torque from a torque tool to the socket fastener. The first base 14 and the second base 15 are positioned opposite to each other along the plurality of laterally-bracing sidewalls 2. Additionally, the first base 14, and thus second base 15, is preferably oriented perpendicular to each of the plurality of laterally-bracing sidewalls 2 and thus enclose/complete the prism shape of the screw bit body 1. More specifically, it is preferred that the first base 14 comprises a first base surface 26, wherein the first base surface 26 is flat and is oriented perpendicular to the bracing surface 5 of each of the plurality of laterally-bracing sidewalls 2. The bracing surface 5 may further comprise a first portion 33. The first portion 33 is a section of the bracing surface 5 positioned along a first distance 21, which arranges the first portion 33 adjacent to the first lateral edge 3. The attachment body 19 allows the present invention to be attached to an external torque tool and, thus, allow torque force to be applied to the socket fastener through the screw bit body 1. The attachment body 19 is centrally positioned around and along a rotation axis 16 of the screw bit body 1 such that the rotation axis of the attachment body 19 and the rotation axis 16 of the screw bit body 1 are coincidentally aligned. Additionally, the attachment body 19 is connected adjacent to the second base 15. The attachment body 19 preferably has a hexagonal cross-section in order to fit within a female attachment member of the external torque tool. External torque tools include, but are not limited to, electric drills, torque wrenches, pneumatic drills, socket screw drivers, and other similar torque tools. The engagement cavity 8 preferably combines a curved portion with a straight portion but can alternatively be any shape as preferred by the user, including, but not limited to, a partially-circular, triangular or rectangular shape. Additionally, the shape of each portion of the engagement cavity 8 can be a shape from a group consisting of, straight line, and or concave, and or convex if preferred. The combination or singular use of these shapes could further improve the longevity, safety, and functionality of the present invention in certain applications as determined by the user. In an exemplary embodiment, the entire cross-section 9 of the at least one engagement cavity 8 is a triangular profile. This arrangement provides ample space while applying torque for relief of residual stresses and material that would otherwise strain the at least one engagement cavity 8. Furthermore, the triangular profile may be concave along a direction from the first lateral edge 3 to the second lateral edge 4. In this way, torqueing stresses are captured within the at least one engagement cavity 8 during the application of torsion. In another exemplary embodiment, the at least one engagement cavity 8 contains both curved and straight portions. This arrangement allows the at least one engagement cavity 8 to interact optimally with different fastener profiles, materials or different levels of stress during use. In one embodiment of the present invention, shown in FIG. 27-28, the at least one engagement cavity 8 is elliptic in shape. The partially or semi-elliptic profile offers greater strength than other comparable embodiments such as a semi-circular shape. In an elliptic configuration, the at least one engagement cavity 8 is shallower and wider than a semi-circular shape, providing additional strength to the screw-bit body 1 and stress points along the bracing surface 5, especially when force is applied near the lateral edge. The first portion 33 and the second portion 34 of the bracing surface may be colinear in this embodiment. As an alternative to the elliptic shape, the at least one engagement cavity 8 may be any combination of radial curves, straight segments, and angular portions, such as a trapezoidal shape. In preferred embodiments, any combination of curves and segments making up the at least one engagement cavity 8 are connected to one another at obtuse angles, such that the at least one engagement cavity is entirely concave.

Some embodiments are generally more advantageous for leverage and resistance of mechanical wear during use. To this end, the at least one engagement cavity 8 is positioned offset from the first lateral edge 3 of the at least one specific sidewall 36 by a first distance 21, as shown in FIGS. 9, 18, 19, 21 and 22. Resultantly, a gripping point is created by the at least one engagement cavity 8 and the bracing surface 5. The first portion 33 of the bracing surface 5 of the at least one specific sidewall 36 may be positioned along the first distance 21. In this way, the first distance 21 may denote area including a segment of the first portion 33. A width distance 35 of the at least one engagement cavity 8 may be positioned parallel to the bracing surface 5. This arrangement allows the width distance 35 to be parallel to the first distance 21. The width distance 35 may be greater than the first distance 21. In this way, the at least one engagement cavity 8 is ensured to span across a significant portion of the useful area for the bracing surface 5.

The first portion 33 of the present invention may take a variety of shapes as may be found to be advantageous under various stresses or use cases. To ensure an appropriate shape of the at least one engagement cavity 8, the first portion 33 may be a shape selected from the group consisting of: straight line, concave, and convex, as shown in FIG. 14 through 17. Any of these shapes could provide optimal support during use, improving the duration of the present invention.

The bracing surface 5 may further benefit from a more complex shape or arrangement. To enable this, the bracing surface 5 may further comprise a second portion 34, as shown in FIG. 14 through 20, and 28. The second portion 34 is a section of the bracing surface 5 positioned along a second distance 22, which arranges the second portion 34 adjacent to the second lateral edge 4. The at least one engagement cavity 8 may be positioned offset from the second lateral edge 4 of the at least one specific sidewall 36 by a second distance 22. The second distance 22 denotes the space opposite the first distance 21 between the at least one engagement cavity 8 and the second lateral edge 4. The second portion 34 of the bracing surface 5 of the at least one specific sidewall 36 may be positioned along the second distance 22. In this way, the second distance 22 may denote area including a segment of the second portion 34. The second portion 34 may be a shape selected from the group consisting of: straight line, concave, and convex. In this way, the second portion 34 may be adapted to best address potential mechanical fatigue to the present invention. Furthermore, the at least one engagement cavity 8 may taper perpendicular to a rotational axis, from a position adjacent to the first distance 21 or the second distance 22 towards a lateral edge. This arrangement allows for optimal application of force during rotational usage of the present invention. A bracing surface geometric plane positioned along the bracing surface 5, adjacent to the at least one engagement cavity 8, is preferably colinear with a lateral edge geometric plane that extends from the first lateral edge 3 to second lateral edge 4; however, in some embodiments, the bracing surface geometric plane may be offset from, rather than colinear with, the lateral edge geometric plane.

In many circumstances, the user may wish to provide torsional pressure from different angles within an external screw. To provide for this, the second portion 34 of the bracing surface 5 of the at least one specific sidewall 36 may be positioned at a portion angle from the first portion 33 of the bracing surface 5 of the at least one specific sidewall 36. This arrangement ensures that alternative shapes of external screw holes may be accurately filled by, and are within the scope of, the present invention.

Figure 15:
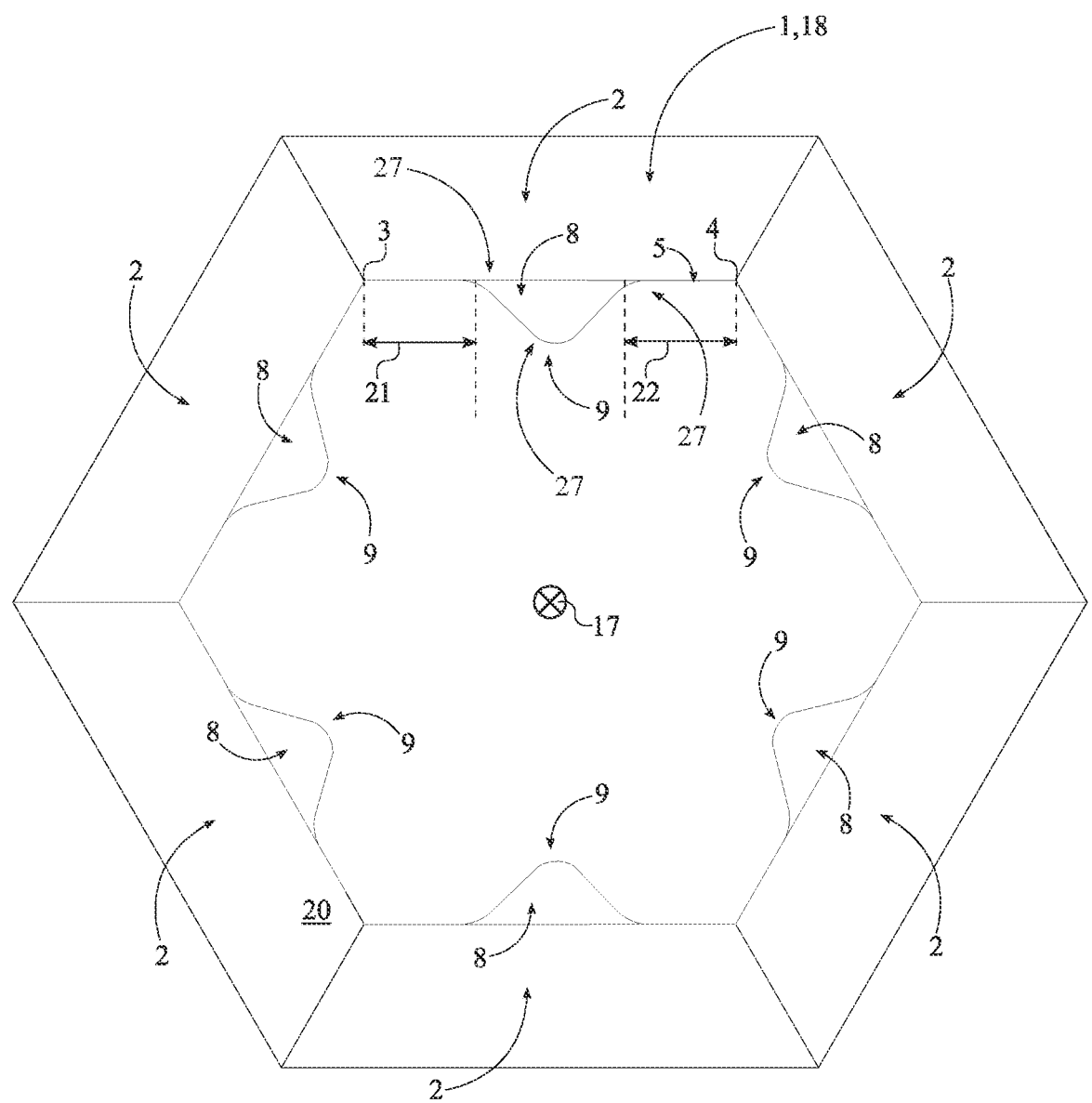
FIG. 15 is a front view of another separate alternative embodiment of the present invention in relation to FIG. 2, wherein an entire cross-section of the engagement cavity as a triangular profile.

The triangular profile may further comprise a plurality of vertexes 27, as represented in FIG. 15. The plurality of vertexes 27 relates to the locus of points representing corners of the triangular profile. Each of the plurality of vertexes 27 may be a rounded corner. This arrangement prevents point stresses from building at the plurality of vertexes 27 without significantly reducing the space required for effective mitigation of fatigue effects.

Figure 16:
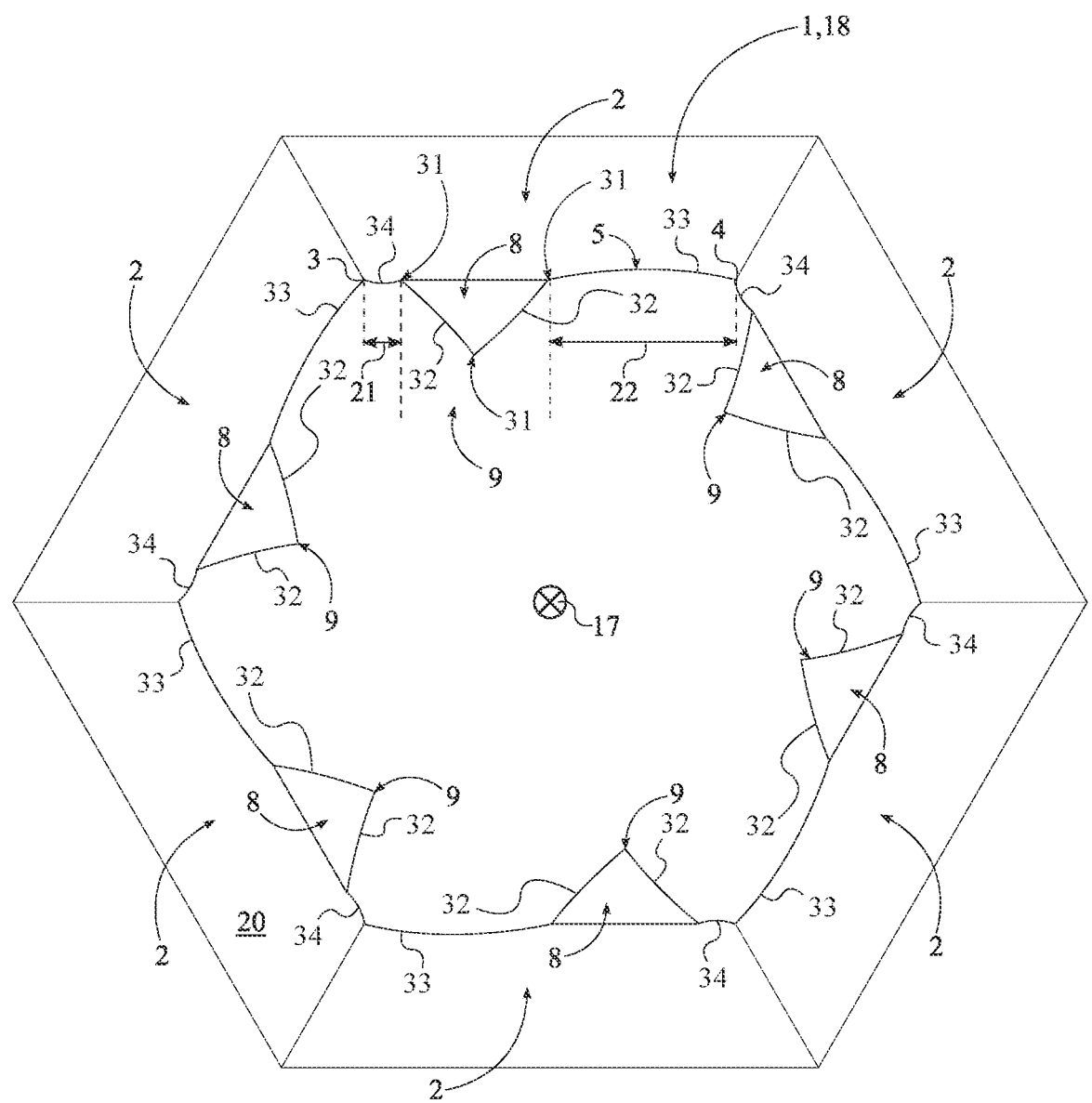
FIG. 16 is a front view of another separate alternative embodiment of the present invention in relation to FIG. 15, wherein different portions of a laterally-bracing sidewall are either concave or convex.
Figure 17:
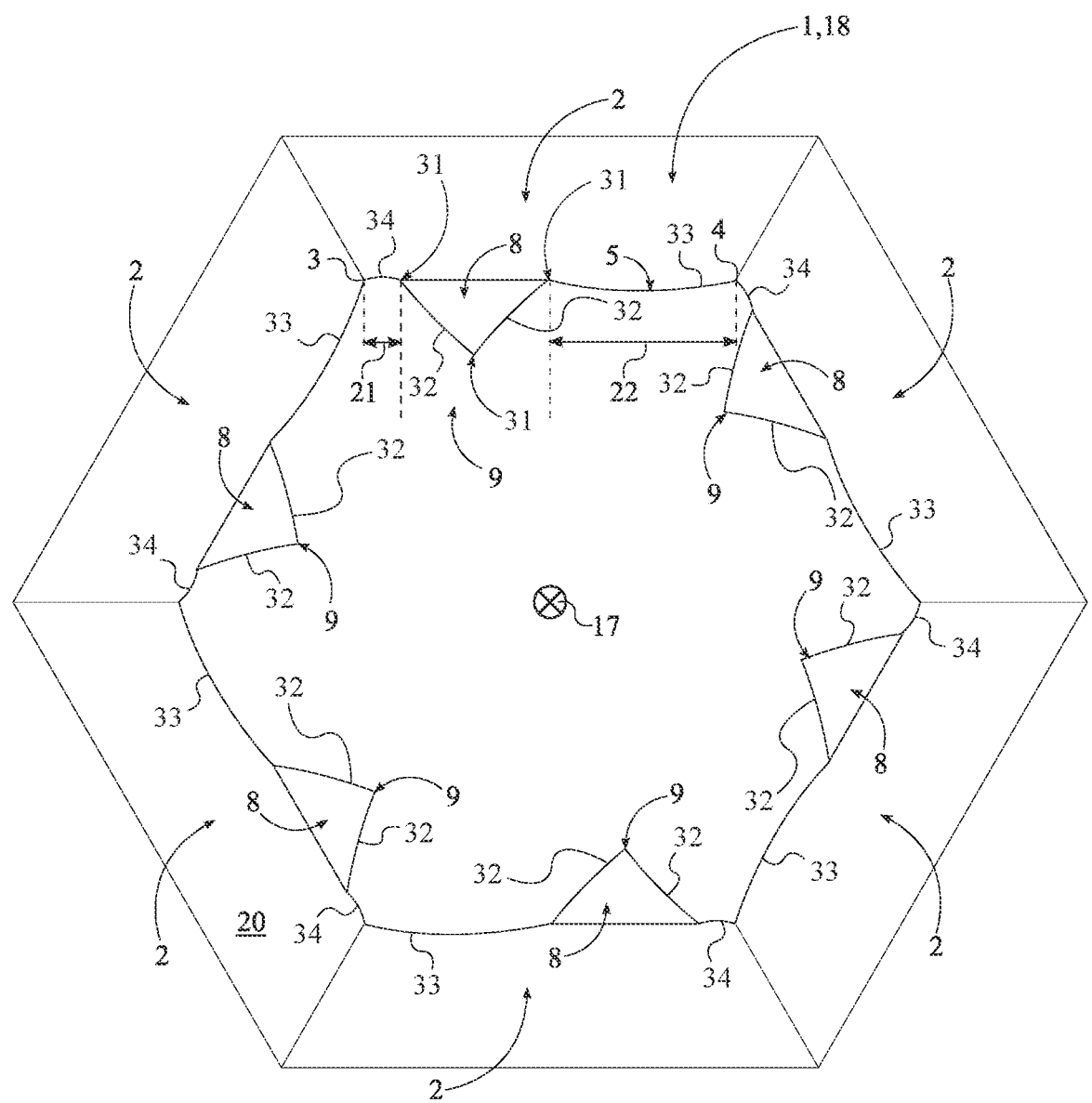
FIG. 17 is a front view of another separate alternative embodiment of the present invention in relation to FIG. 15, wherein different portions of a laterally-bracing sidewall are either convex or concave.
Figure 18:
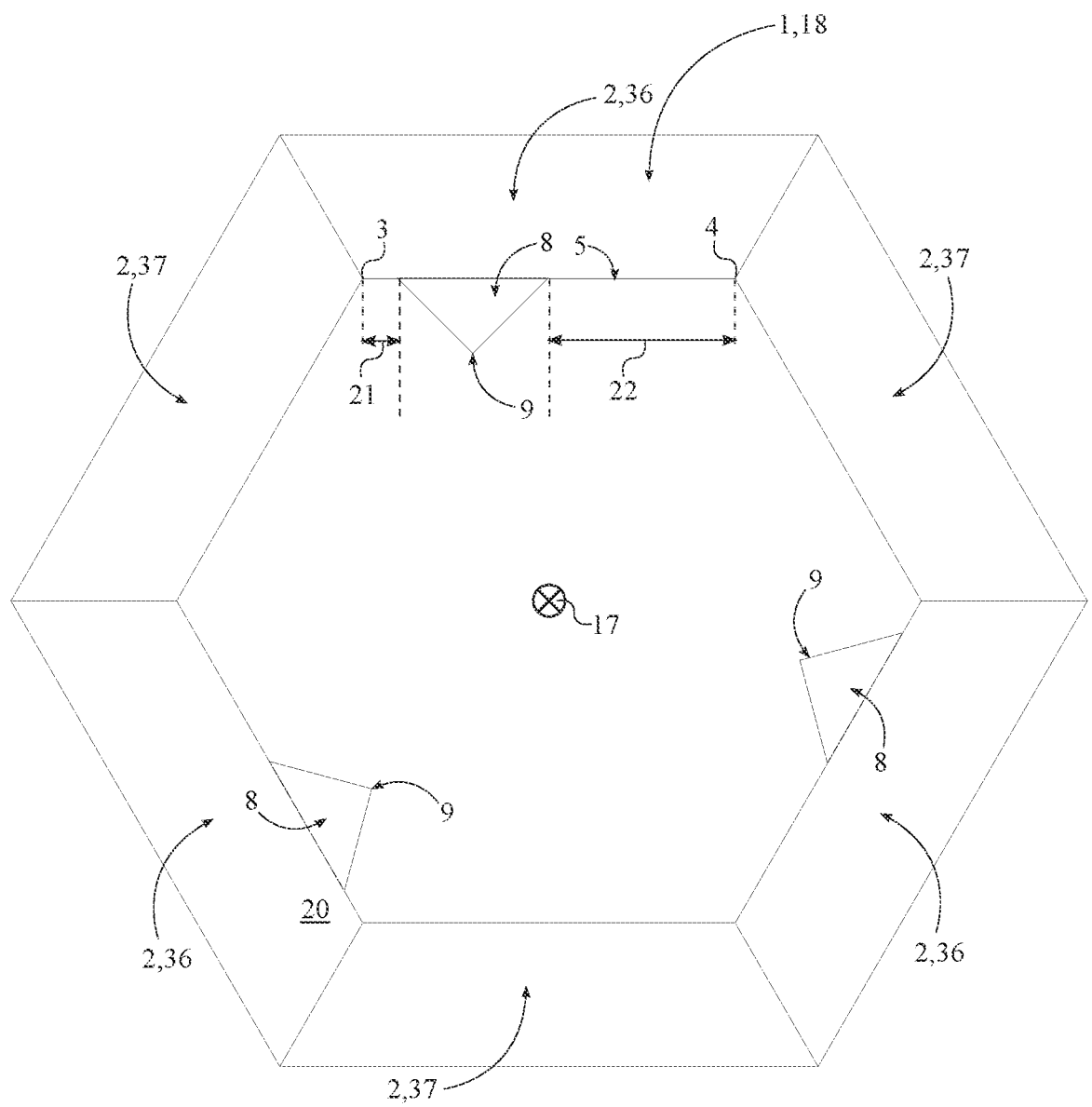
FIG. 18 is a front view of another separate alternative embodiment of the present invention in relation to FIG. 15, wherein engagement cavities are configured between flat sidewalls.

In many cases, it may be advantageous to allow for slight modifications to a strictly triangular profile, depending upon the intensity of torqueing stresses and the shape of the bolt or fixture. To enhance efficiency in such situations, the triangular profile may comprise a plurality of vertexes 31 and a pair of elongated portions 32, as shown in FIGS. 16 and 17. The plurality of vertexes 31 relates to a set of points representing the corners of the triangular profile. The plurality of vertexes 31 may be viewed as two leading edge elements along the first lateral edge 3 and the second lateral edge 4 and one cavity base element. The one cavity base element may also be a straight line connected to the pair of elongated portions 32. The pair of elongated portions 32 denotes the edges which join the plurality of vertexes 31 together. The pair of elongated portions 32 is interspersed amongst the plurality of vertexes 31. Thus, the pair of elongated portions 32 connects each of the plurality of vertexes 31 together. Each of the pair of elongated portions 32 is a shape selected from the group consisting of: straight line, concave, and convex. The group of shapes that may be selected for the plurality of vertexes 31, the pair of elongated portions 32, or the one cavity base element may be a radius or angular shape. This arrangement enables the pair of elongated portions 32 to better adapt to different torqueing stresses, thus preventing detrimental wear upon the used bit due to fatigue. Other uses may call for modifications to the shape of the edges surrounding the triangular profile together. To provide for this, a bracing surface 5 comprises a first portion 33 and a second portion 34, as shown in FIGS. 16 and 17. The first portion 33 and the second portion 34 relate to the edges surrounding the triangular profile. The first portion 33 is positioned along a first distance 21, which arranges the first portion 33 adjacent to the first lateral edge 3. In addition, the second portion 34 is positioned along a second distance 22, which arranges the second portion 34 adjacent to the second lateral edge 4. The group of shapes that may be selected for the first portion 33 and the second portion 34, as shown in FIGS. 16 and 17, may be a radius or angular shape. It is often most advantageous for the first portion 33 and the second portion 34 to display opposite curvatures, with one being concave and the other being convex, for optimal reduction of cyclical stress-based effects on the present invention. Additional modifications may be implemented to the first lateral edge 3 and the second lateral edge 4 to form lateral edges which are angular or radial in shape.

Figure 3:
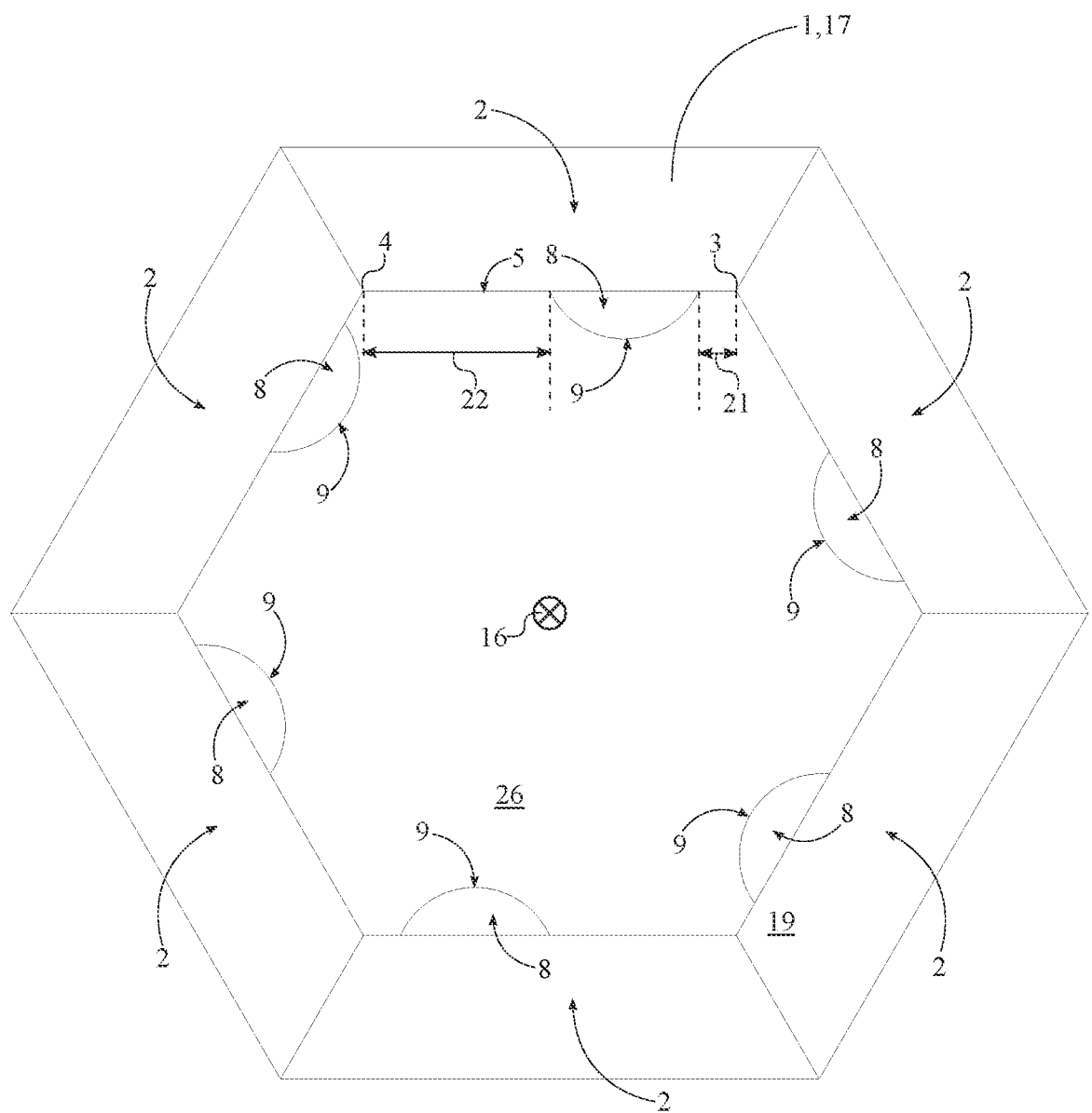
FIG. 3 is a front view of the alternative embodiment of the present invention in FIG. 2.
Figure 4:
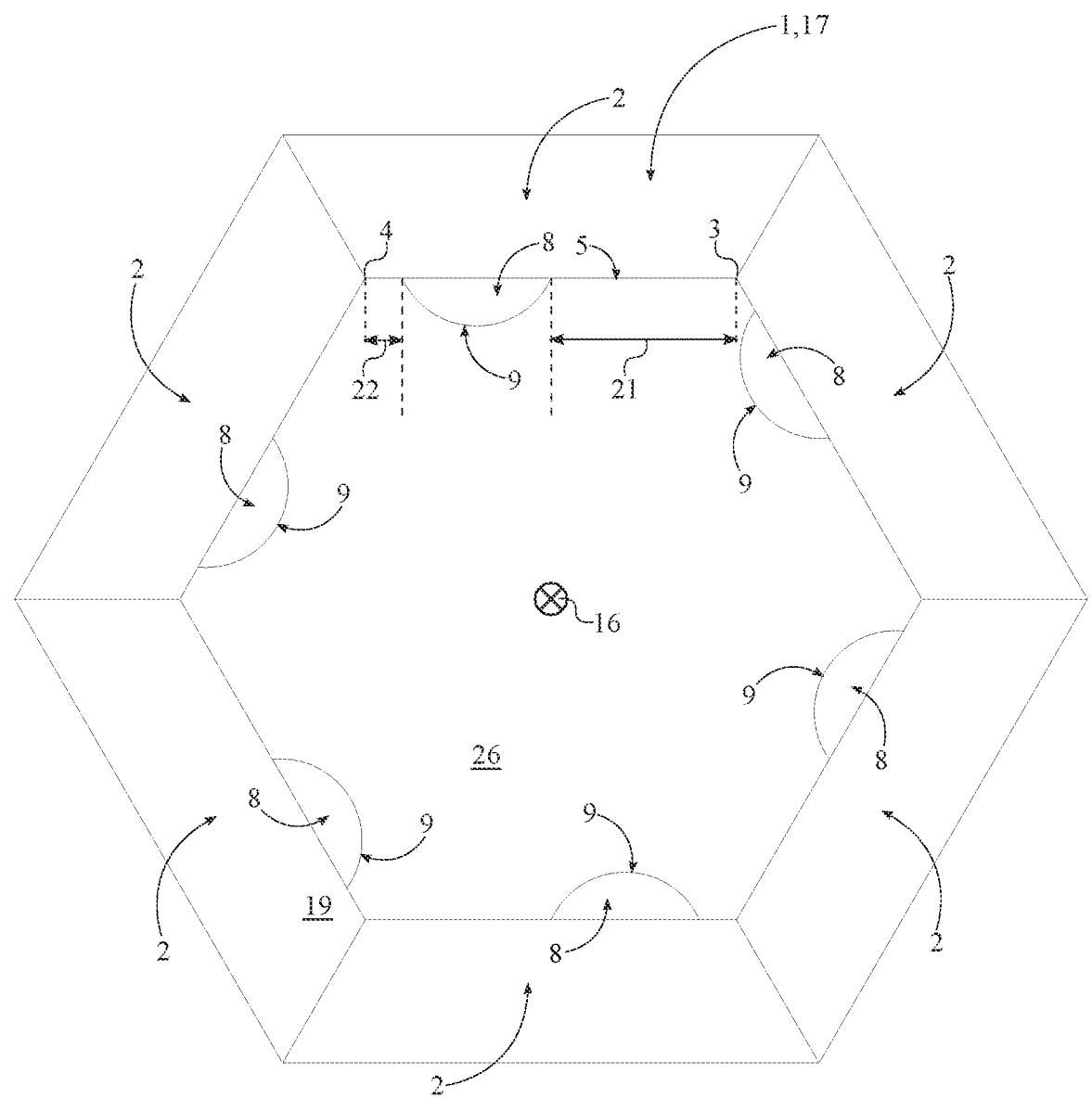
FIG. 4 is a rear view of the alternative embodiment of the present invention in FIG. 2.

Referring to FIG. 3 and FIG. 4, each of the plurality of laterally-bracing sidewalls 2 comprises a first lateral edge 3, a second lateral edge 4, and a bracing surface 5. The plurality of laterally-bracing sidewalls 2 is radially positioned about the rotation axis 16 of the screw bit body 1 in order to yield a geometric profile complimentary to that of the socket fastener. The number within the plurality of laterally-bracing sidewalls 2 is subject to change to compliment the shape and profile of a variety of socket fasteners. In one embodiment of the present invention, the number within the plurality of laterally-bracing sidewalls 2 is six and the resulting geometric profile of the screw bit body 1 is a hexagon. In an alternative embodiment of the present invention, the number within the plurality of laterally-bracing sidewalls 2 is four.

The bracing surface 5 physically presses against the socket fastener, specifically against the lateral sidewall of a head portion from the socket fastener. The first lateral edge 3 and the second lateral edge 4 are positioned opposite to each other across the bracing surface 5. When viewed from either the top perspective or the bottom perspective, the first lateral edge 3 and the second lateral edge 4 from each of the plurality of laterally-bracing sidewalls 2 make up the corners of the screw bit body 1. The engagement cavity 8 extends normal and into the bracing surface 5 of at least one specific sidewall 36 from the plurality of laterally-bracing sidewalls 2 and creates an additional gripping point/tooth on the bracing surface 5. In another embodiment, the gripping point is created by the engagement cavity 8 and an adjacent edge, wherein the adjacent edge is either the first lateral edge 3 or the second lateral edge 4; in particular, the adjacent edge is the edge closest to the engagement cavity 8. Additionally, the engagement cavity 8 extends into the screw bit body 1 from the first base 14 towards the second base 15. This ensures that the additional gripping point extends along the length of the screw bit body 1 for maximum grip engagement between the screw bit body 1 and the socket fastener.

Figure 11:
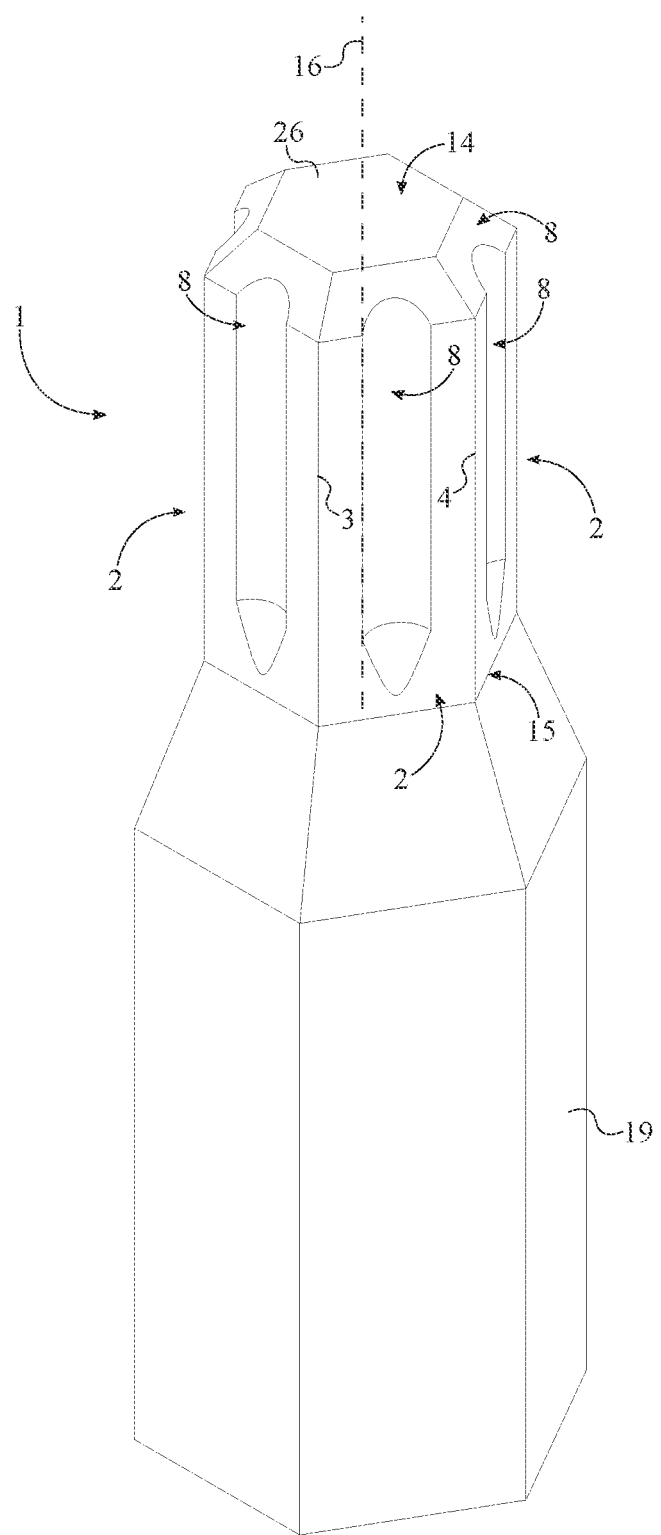
FIG. 11 is a perspective view of an alternative embodiment of the present invention.
Figure 13:
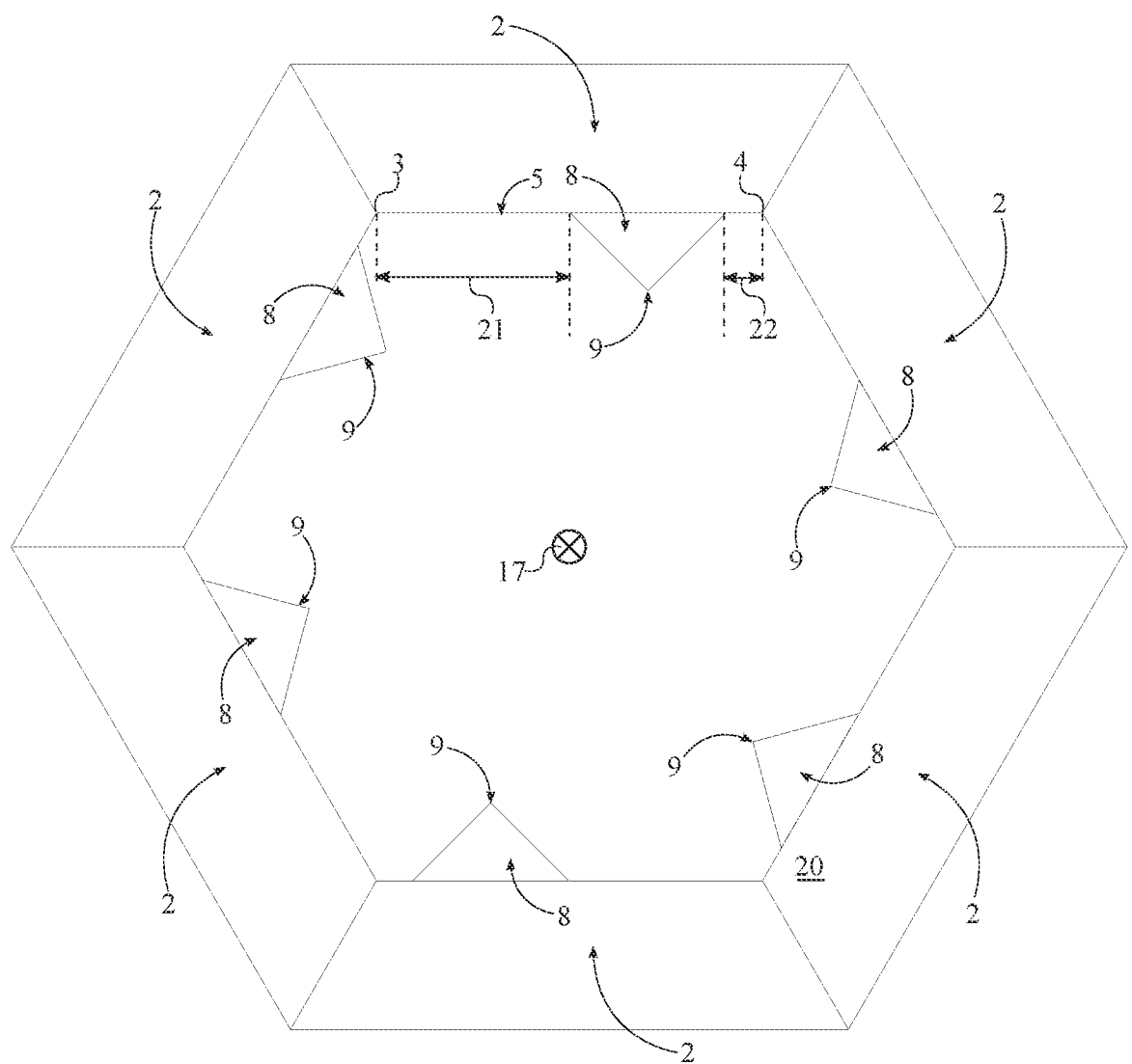
FIG. 13 is a front view of a separate alternative embodiment of the present invention in relation to FIG. 2, wherein an entire cross-section of the engagement cavity as a triangular profile.
Figure 14:
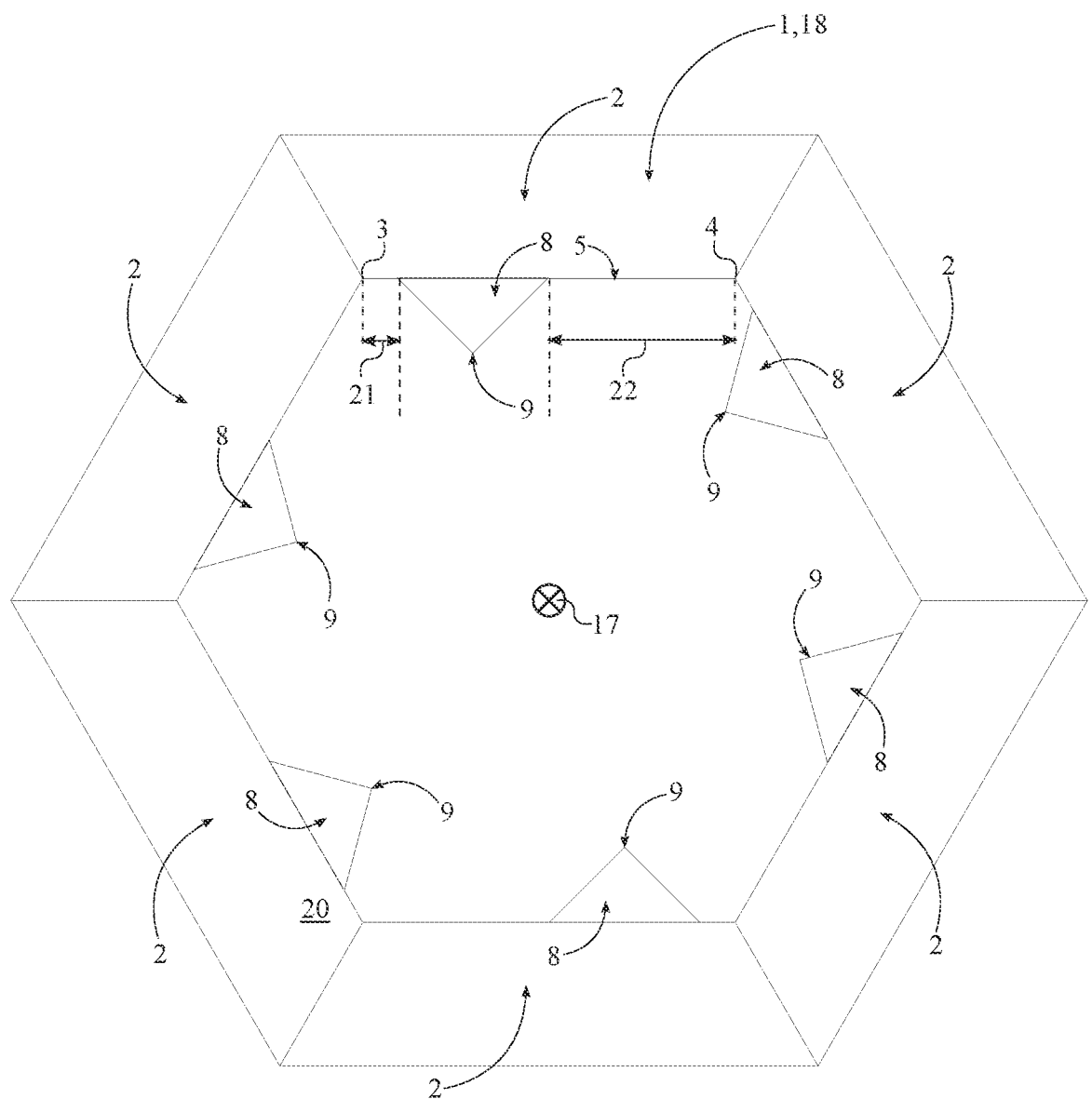
FIG. 14 is a rear view of the separate alternative embodiment of the present invention in relation to FIG. 2, wherein an entire cross-section of the engagement cavity as a triangular profile.

To further accomplish this, it is preferred that an entire cross-section 9 of the engagement cavity 8 is parallel to the first base 14 and the second base 15. In some embodiments of the present invention, the at least one engagement cavity 8 also tapers from the first base 14 to the second base 15 as seen in FIG. 11. As a consequence of this embodiment, the at least one engagement cavity 8 may taper from the first base 14 to the second base 15 in such a way that the triangular profile adjacent to the first base 14 is larger than the triangular profile adjacent to the second base 15. In this way, the at least one engagement cavity 8 may be appropriately shaped to meet the needs and requirements of the user. Referring to FIG. 3, in one embodiment of the present invention, the entire cross-section 9 of the engagement cavity 8 is a partially-circular profile. Additionally, the partially-circular profile is concave along a direction from the first lateral edge 3 to the second lateral edge 4. The partially-circular profile ensures that there are little to no high stress points in the screw bit body 1, thus increasing the overall longevity of the tool. Referring to FIG. 13 and FIG. 14, in a separate embodiment of the present invention, the entire cross-section 9 of the engagement cavity 8 is a triangular profile. Additionally, the triangular profile is concave along a direction from the first lateral edge 3 to the second lateral edge 4. Alternative profiles may be used for the engagement cavity 8 including, but not limited to, a partially or semi-square profile, a partially or semi-rectangular profile, a partially or semi-ellipse profile, and a partially or semi-oval profile.

Figure 8:
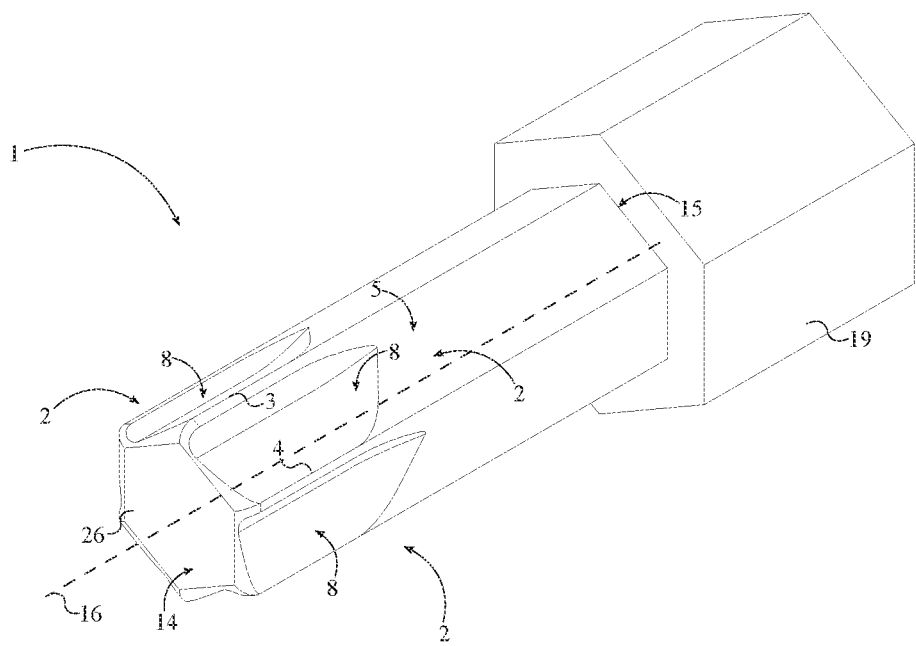
FIG. 8 is a perspective view of an alternative embodiment of the present invention.
Figure 9:
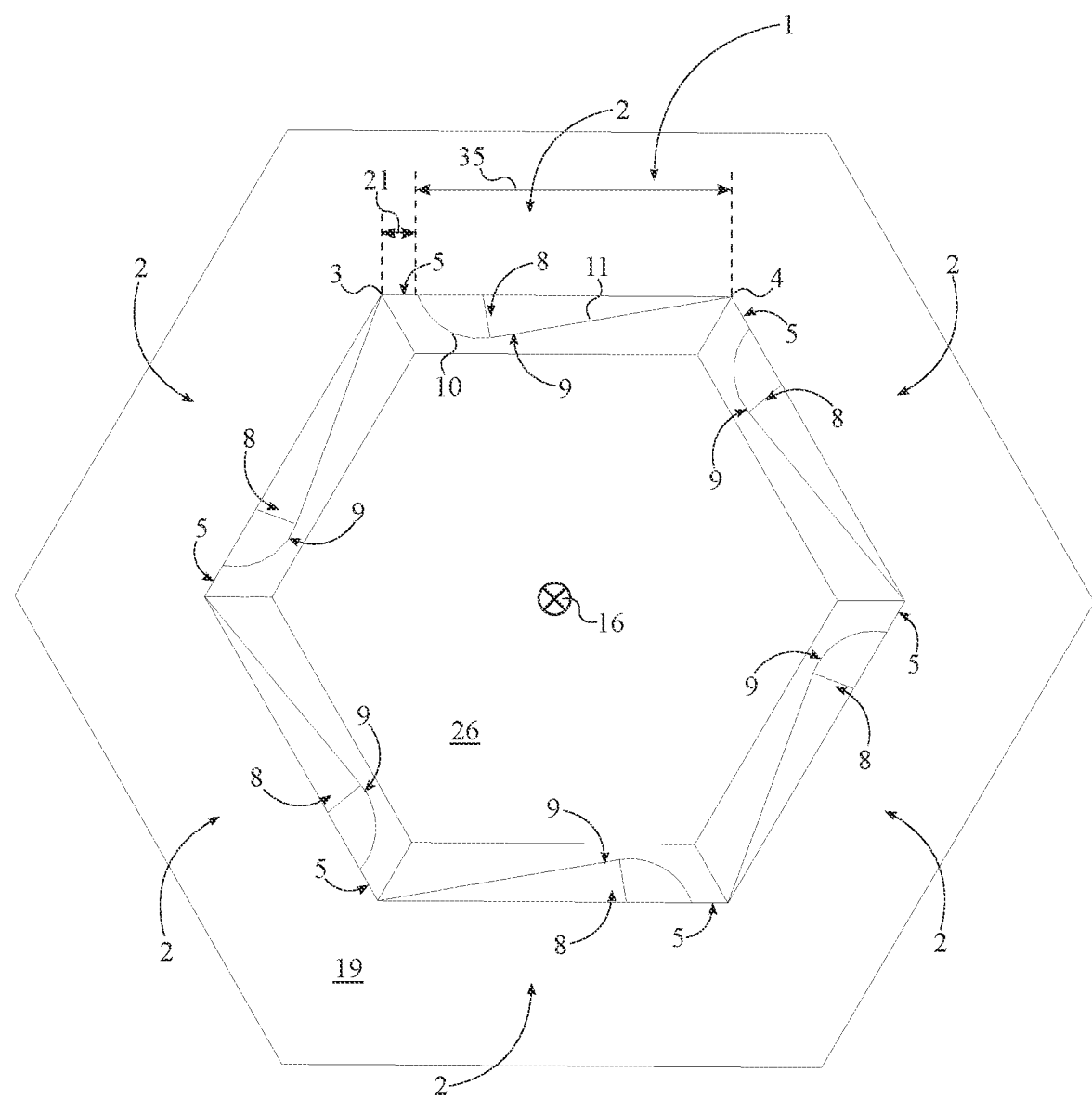
FIG. 9 is a front view of the alternative embodiment of the present invention in FIG. 8.

In one embodiment of the present invention, referring to FIG. 8 and FIG. 9, the entire cross-section 9 of the engagement cavity 8 comprises a curved portion 10 and a straight portion 11. In this embodiment, the present invention is implemented as an extraction bit, wherein the present invention is designed to extract damaged or broken fasteners, damaged rods, broken studs, and other similar items. The engagement cavity 8 is uniquely shaped in order to form a sharp engagement tooth that grips in the corners of the socket fastener, allowing material from the internal sides of the fastener socket into the engagement cavity 8 and thus yielding a superior grip over traditional tools which are simply designed to push material away. This is especially true for worn or damaged fastener socket. More specifically, the curved portion 10 is a semi-circular curve that is positioned adjacent to the first lateral edge 3. The curved portion 10 is positioned adjacent to the first portion 33 of the bracing surface 5 of the at least one specific sidewall 36, opposite the first lateral edge 3. This arrangement allows the first portion 33 to effectively position the curved portion 10 relative to the first distance 21. The straight portion 11 is positioned adjacent to the curved portion 10, opposite the first portion 33. The straight portion 11 guides a portion of the socket fastener to press against the engagement tooth. As such, the straight portion 11 extends from the curved portion 10 to the second lateral edge 4. Specifically, the straight portion 11 starts at the curved portion 10 and ends at the second lateral edge 4.

Figure 19:
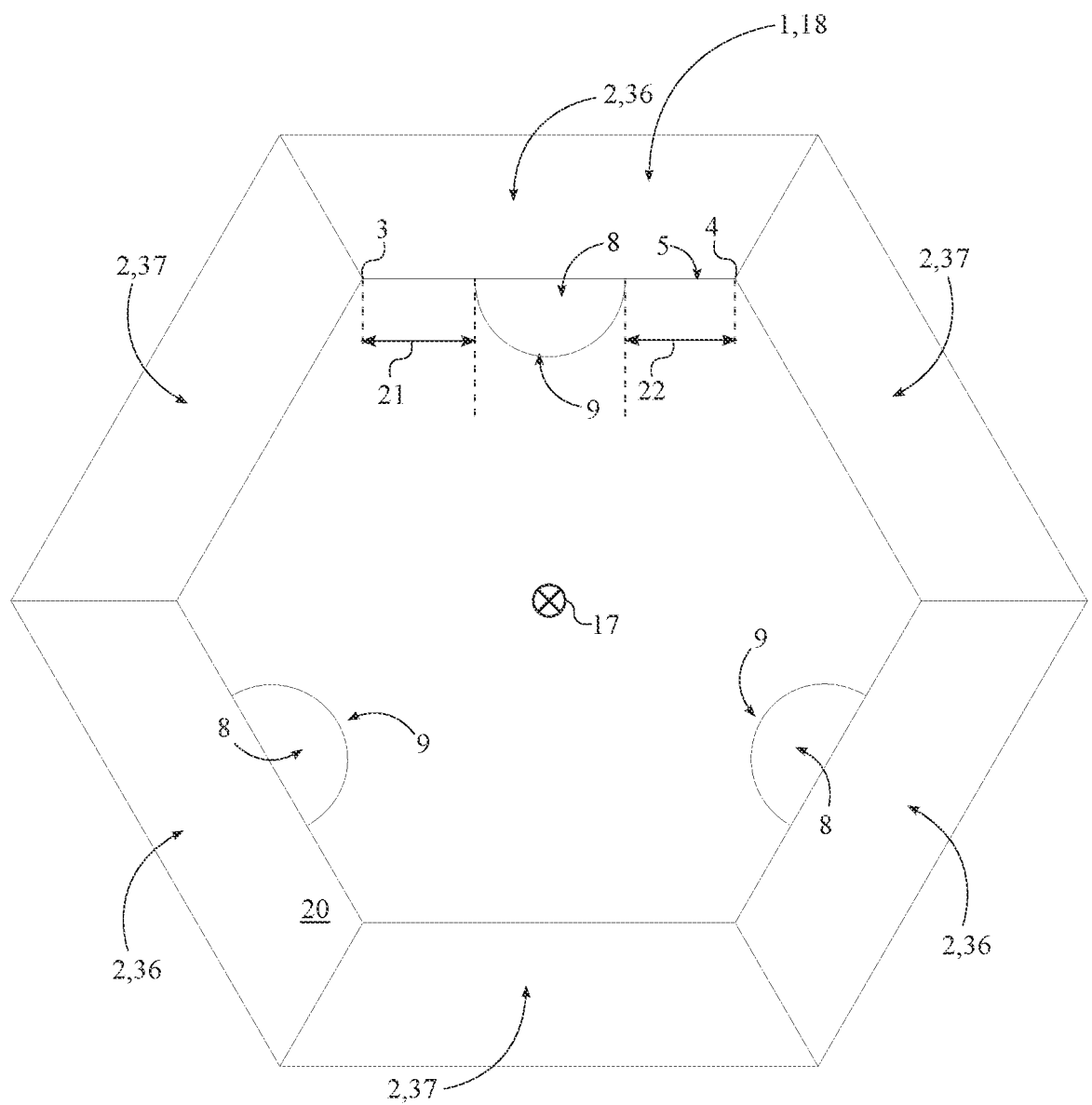
FIG. 19 is a front view of another separate alternative embodiment of the present invention in relation to FIG. 15, wherein engagement cavities are configured between flat sidewalls.
Figure 20:
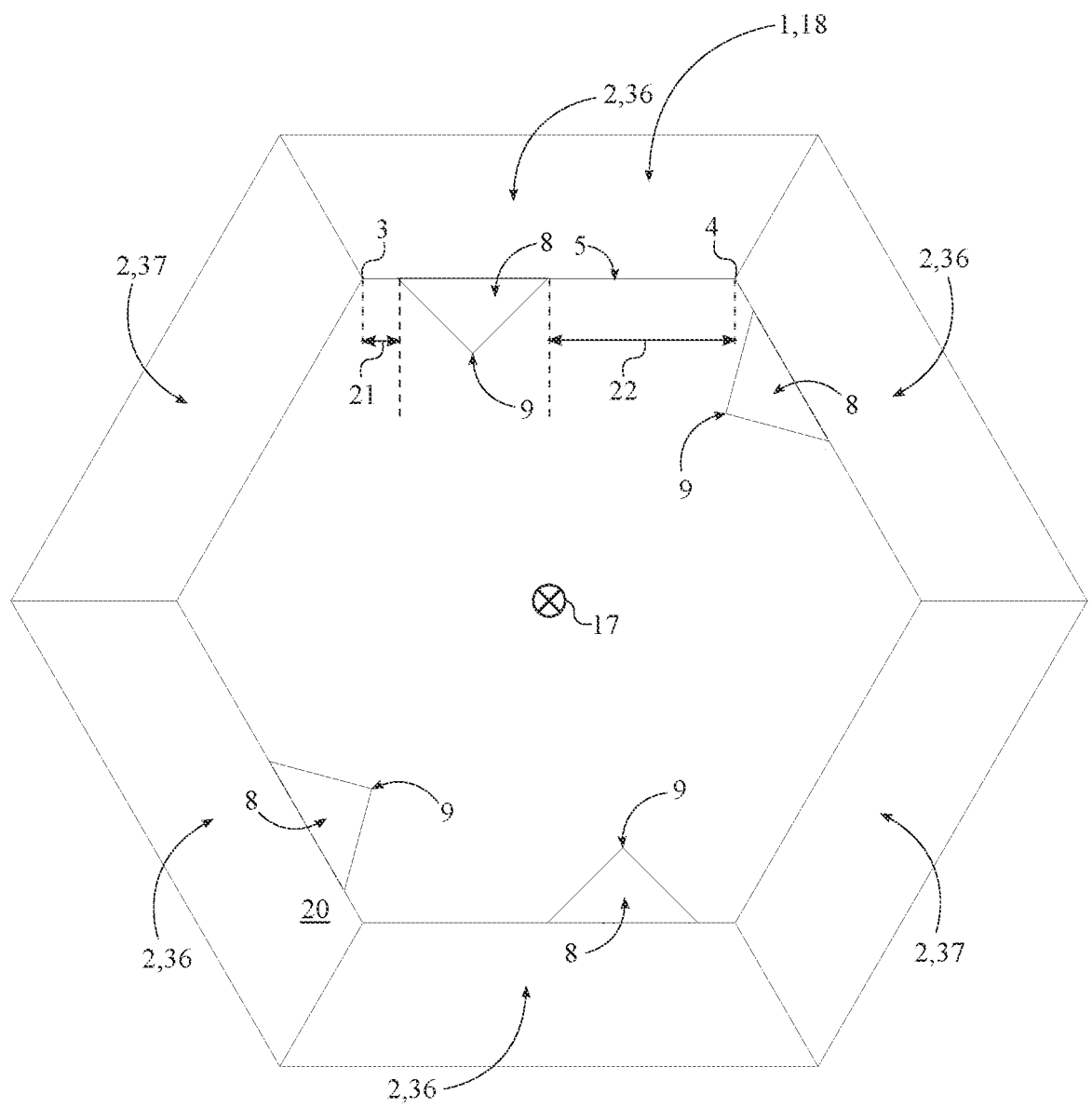
FIG. 20 is a front view of another separate alternative embodiment of the present invention in relation to FIG. 15, wherein engagement cavities are configured between flat sidewalls.
Figure 22:
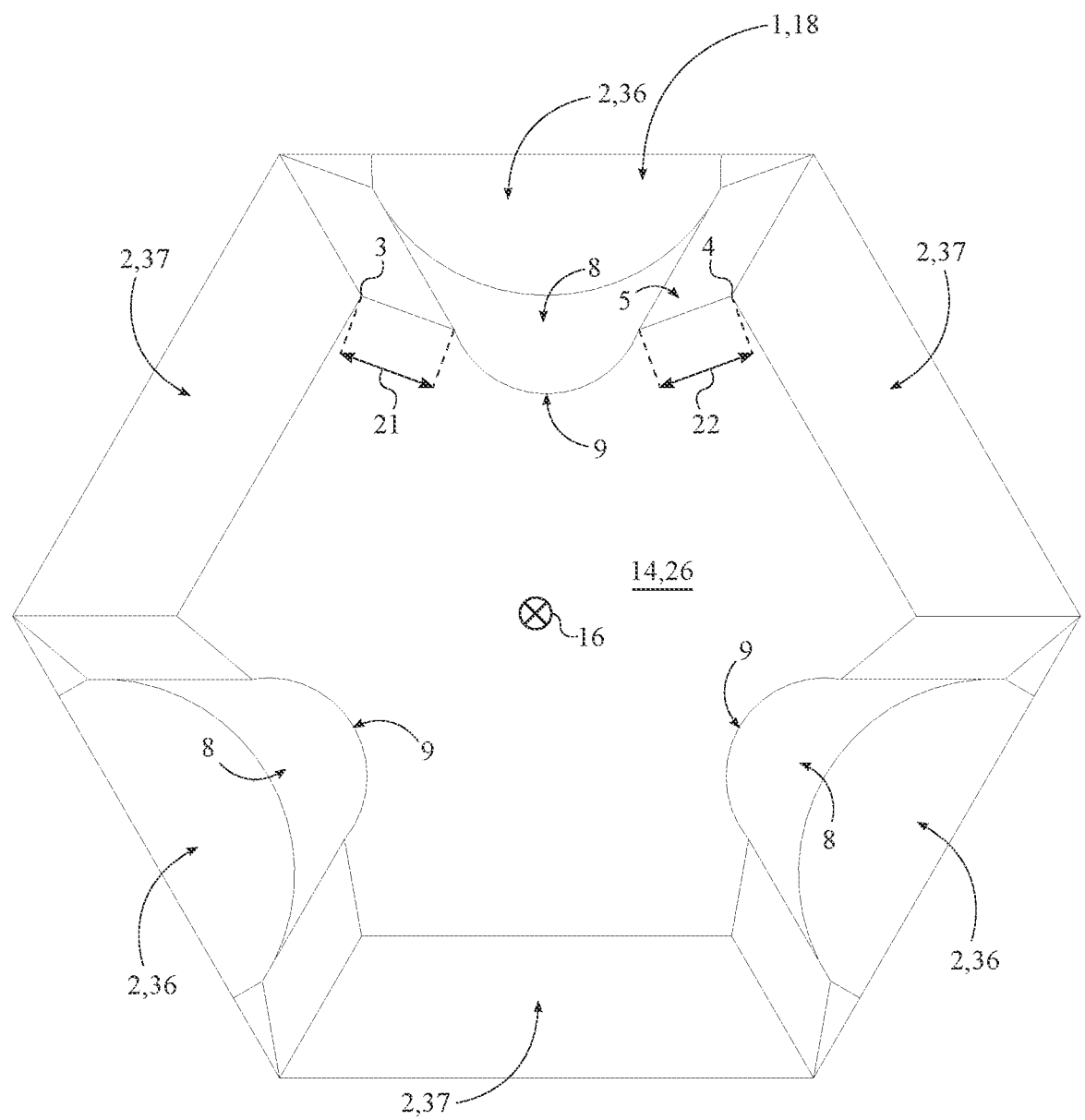
FIG. 22 is a front view of another separate alternative embodiment of the present invention in relation to FIG. 15, wherein engagement cavities are configured between flat sidewalls.
Figure 28:
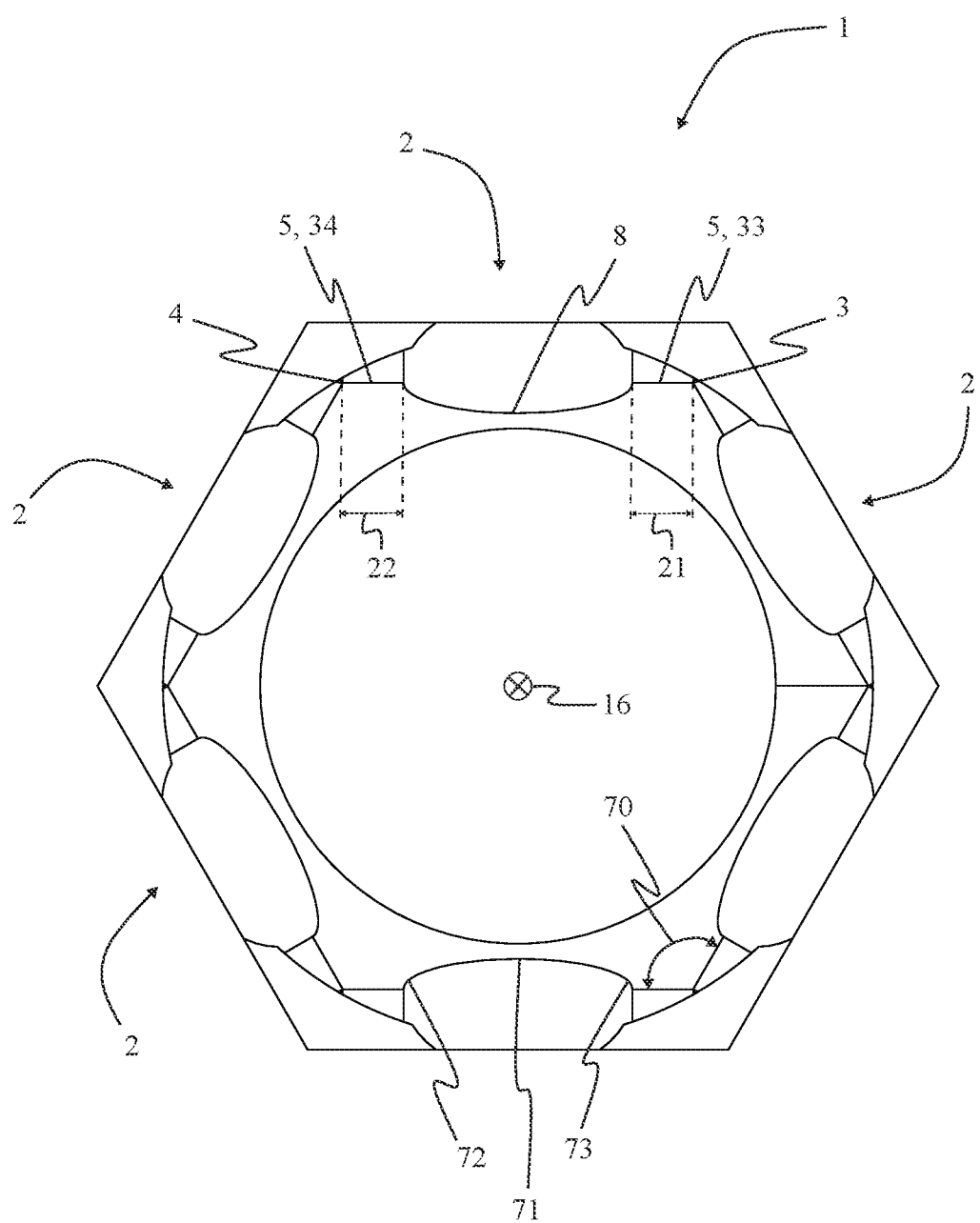
FIG. 28 is a front view of an embodiment of the present invention with an elliptic engagement cavity.

In another embodiment of the present invention, referring to FIG. 11, the engagement cavity 8 is centrally positioned on the bracing surface 5. In particular, the engagement cavity 8 is positioned offset from the second lateral edge 4 of the at least one specific sidewall 36 by a second distance 22. For central positioning, the first distance 21 is equal to the second distance 22, which is shown in FIG. 15. This positions the engagement cavity 8 to engage the internal lateral sidewall of the socket fastener and moves the torqueing stresses to or away from the fastener lateral corners to enhance the gripping function and prevent fastener rounding for the most efficient transfer of torque with the least possibility of slippage. Additionally, this embodiment may be used to rotate the socket fastener in either the clockwise or the counter-clockwise direction. It may also be desirable for the plurality of intermittent sidewalls 24 to be interspersed among the at least one specific sidewall 36 in an embodiment in which the first distance 21 is equal to the second distance 22, which is shown in FIGS. 19, 22, and 28.

In another embodiment of the present invention, the proportion between the first distance 21, the second distance 22, and the width of the engagement cavity 8 may be altered in order to achieve a dedicated clockwise or counterclockwise design. In one embodiment, the present invention is configured to be a clockwise drive bit. For this embodiment, the second distance 22 is greater than the first distance 21. In particular, the proportion between the first distance 21, the second distance 22, and the width of the engagement cavity 8 is 1:5:4, thus yielding a design of the present invention which grips and applies torque to the socket fastener in the clockwise direction. This design is used to screw in and secure the socket fastener. In another embodiment, the present invention is configured to be a counter-clockwise screw bit. For this embodiment, the first distance 21 is greater than the second distance 22. In particular, the proportion between the first distance 21, the second distance 22, and the width of the engagement cavity 8 is 5:1:4, thus yielding a design which grips and applies torque to the socket fastener in the counter-clockwise direction. This design is used to release and extract the socket fastener.

Figure 5:
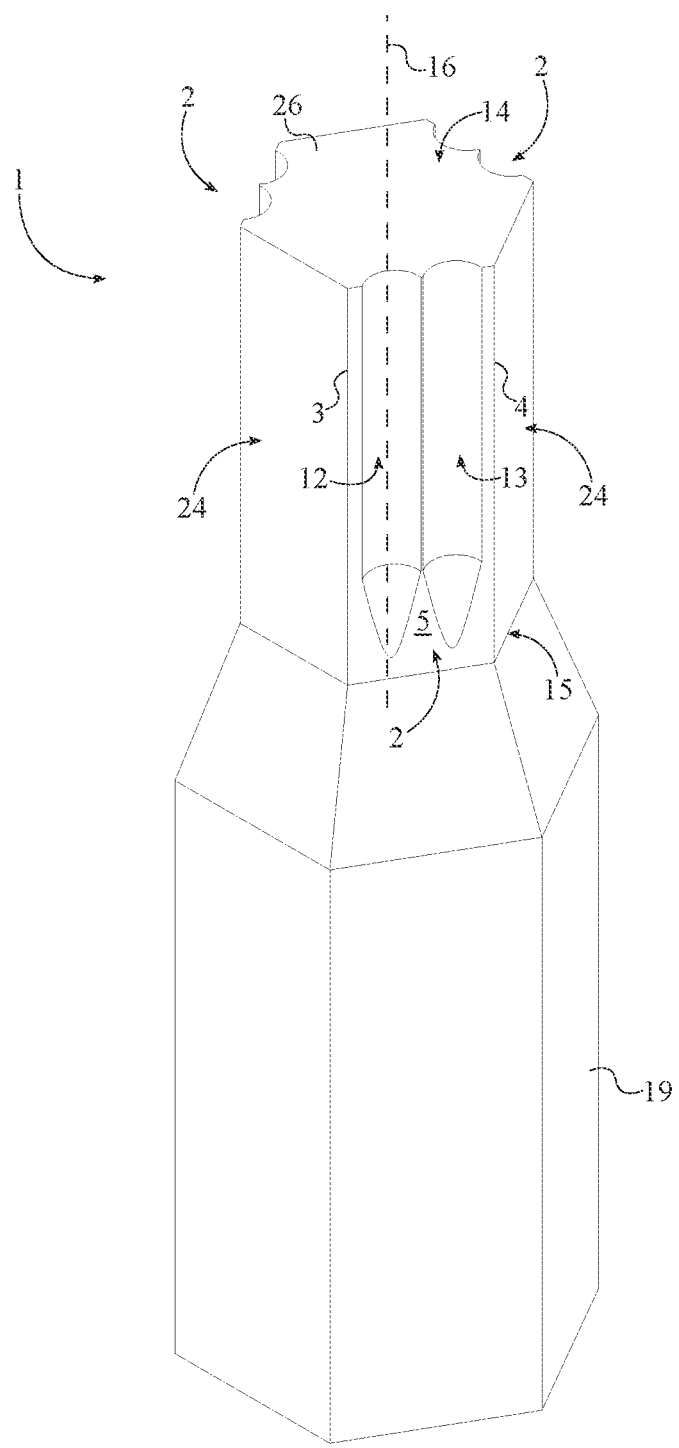
FIG. 5 is a perspective view of an alternative embodiment of the present invention.
Figure 10:
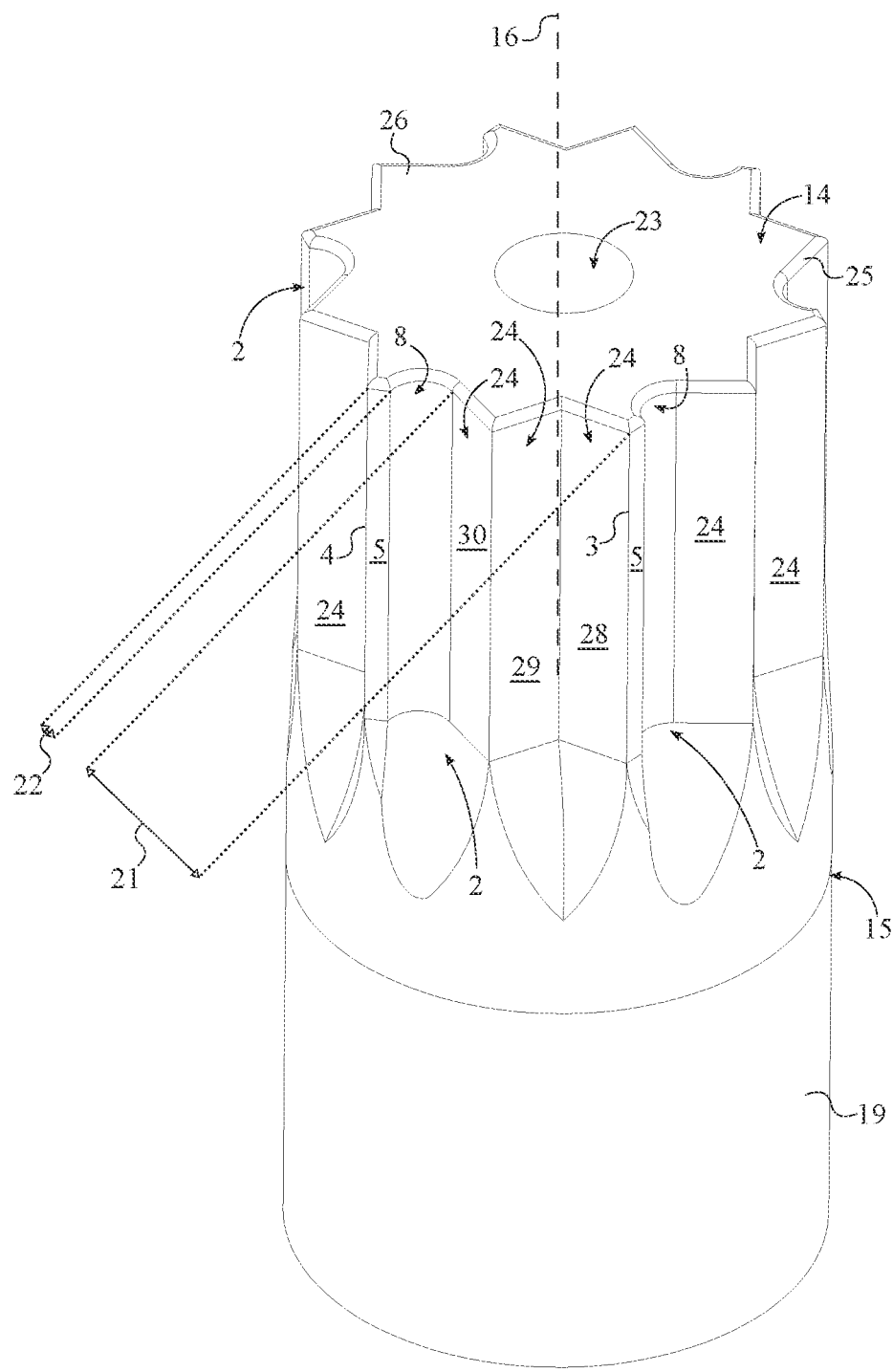
FIG. 10 is a perspective view of an alternative embodiment of the present invention.

Referring to FIG. 5 and FIG. 10, the present invention may also be implemented in a spline/square/other-polygonal bit design. More specifically, if the screw bit body 1 was a spline-type bit body, then the spline-type bit body would be able to transfers torque to the socket fastener through a multitude of protrusions. Thus, the screw bit body 1 may further comprise a plurality of intermittent sidewalls 24, as shown in FIG. 18-22. Each of the plurality of intermittent sidewalls 24 is a flat surface which engages the socket fastener like a traditional screw bit design. The plurality of intermittent sidewalls 24 is radially positioned about the rotation axis 16. Additionally, the plurality of intermittent sidewalls 24 is interspersed amongst the plurality of laterally-bracing sidewalls 2. The ratio between the plurality of laterally-bracing sidewalls 2 and the plurality of intermittent sidewalls 24 is subject to change to yield a variety of different screw bit designs. In one embodiment, the plurality of intermittent sidewalls 24 and the plurality of laterally-bracing sidewalls 2 radially alternate between each other. In another embodiment, there are three sidewalls from the plurality of intermittent sidewalls 24 in between each of the plurality of laterally-bracing sidewalls 2. Resultantly, this configuration places an engagement feature/tooth at every other protrusion of the screw bit body 1.

In an exemplary embodiment, a first intermittent sidewall 28, a second intermittent sidewall 29, and a third intermittent sidewall 30 among the plurality of intermittent sidewalls 24 are interspersed on a corresponding laterally-bracing sidewall among the plurality of laterally-bracing sidewalls 2, as represented in FIG. 10. The first intermittent sidewall 28, second intermittent sidewall 29, and third intermittent sidewall 30 enable effective connection with a fastener while providing the desired space that prevents mechanical wear and fatigue on parts. The first intermittent sidewall 28 and the second intermittent sidewall 29 are perpendicularly positioned to each other. This arrangement results in a 90-degree angle, which may be optimal for certain applications. The third intermittent sidewall 30 is located in between the at least one engagement cavity 8 of the corresponding laterally-bracing sidewall and the second intermittent sidewall 29. Thus, the third intermittent sidewall 30 provides structural support for the at least one engagement cavity 8 during preferred usage of the present invention.

It may be mechanically advantageous or preferable to provide different configurations of the at least one engagement cavity 8, such that the engagement cavity 8 may be present on multiple sidewalls of the at least one screw bit body 1. To provide for this, the at least one specific sidewall 36 may be a plurality of specific sidewalls. This arrangement allows the plurality of specific sidewalls to encompass different patterns around the screw bit body 1. Furthermore, the at least one engagement cavity 8 may be a plurality of engagement cavities. In this way, each specific sidewall may be appropriately shaped with an engagement cavity 8. Finally, each of the plurality of engagement cavities 8 may extend normal and into the bracing surface 5 of a corresponding specific sidewall from the plurality of specific sidewalls. Thus, each specific sidewall may be cavitated, or otherwise shaped, with a cavity of the plurality of engagement cavities 8.

To account for this, the plurality of laterally-bracing sidewalls may further comprise at least one flat sidewall 37. The at least one flat sidewall 37 denotes a sidewall of the plurality of laterally-bracing sidewalls 2 that does not contain specific cavity features. The at least one flat sidewall 37 may be positioned adjacent to the at least one specific sidewall 36. In this way, flat sidewalls may be positioned between each sidewall of the at least one specific sidewall 36, thus allowing different configurations of cavitated and flat sidewalls.

Figure 6:
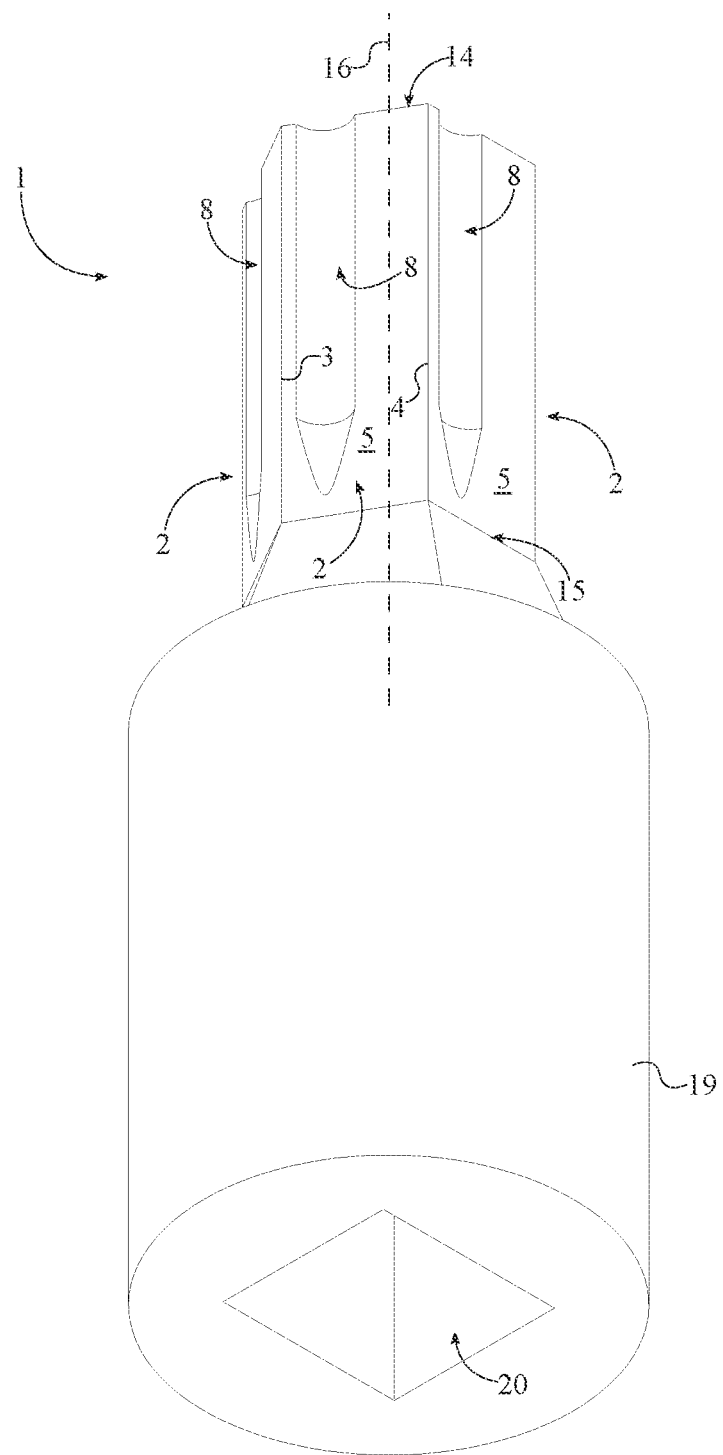
FIG. 6 is a bottom perspective of the present invention.

In another embodiment, referring to FIG. 6, the present invention further comprises an engagement bore 20. The engagement bore 20 allows the present invention to be attached to a male attachment member of an external torque tool, such as a socket wrench or a screwdriver. The engagement bore 20 extends into the attachment body 19 along the rotation axis, opposite the screw bit body 1. The engagement bore 20 is shaped to receive a male attachment member of a socket wrench; the preferred shape is square as the majority of socket wrenches utilize a square attachment member. In this embodiment, the preferred attachment body 19 is cylindrical shaped. In alternative embodiments, the shape and design of the engagement bore 20 and the attachment body 19 may vary to be adaptable to different torque tool designs and different attachment means.

Figure 2:
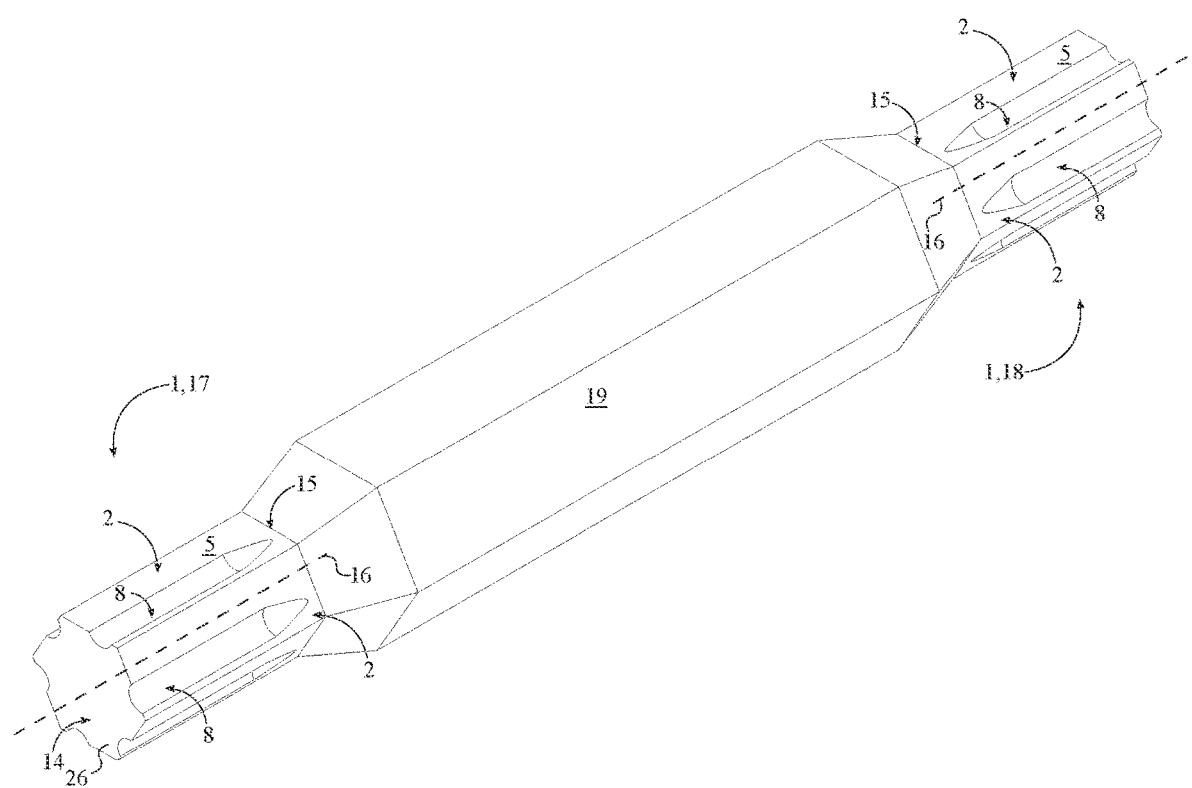
FIG. 2 is a perspective view of an alternative embodiment of the present invention.

In one embodiment, referring to FIG. 2, the present invention is implemented as a dual sided screw bit, thus providing both a clockwise and a counter-clockwise configuration simultaneously in a single tool. In this embodiment, the at least one screw bit body 1 comprises a first screw bit body 17 and a second screw bit body 18. The attachment body 19 preferably has a hexagonal cross-section. The attachment body 19 is centrally positioned around and along the rotation axis 16 of the first screw bit body 17 such that the rotation axis of the attachment body 19 and the rotation axis 16 of the first screw bit body 17 are coincidentally aligned. Additionally, the attachment body 19 is connected adjacent to the second base 15 of the first screw bit body 17. The second screw bit body 18 shares the attachment body 19 with the first screw bit body 17. Thus, the second screw bit body 18 is concentrically positioned with the first screw bit body 17. Additionally, the second screw bit body 18 is positioned adjacent to the attachment body 19, opposite the first screw bit body 17, similar to traditional double-sided screw bit designs. Similar to the first screw bit body 17, the attachment body 19 is connected to the second base 15 of the second screw bit body 18. The first screw bit body 17 is designed to screw in a socket fastener, the clockwise configuration. For this, referring to FIG. 3, the second distance 22 of the first screw bit body 17 is greater than the first distance 21 of the first screw bit body 17. This positions the additional gripping point of the first screw bit body 17 adjacent to the first lateral edge 3 of the first screw bit body 17. The second screw bit body 18 is designed to unscrew/extract the socket fastener, i.e. the counter-clockwise configuration. Referring to FIG. 4, the first distance 21 of the second screw bit body 18 is greater than the second distance 22 of the second screw bit body 18. This positions the additional gripping point of the second screw bit body 18 adjacent to the second lateral edge 4 of the second screw bit body 18.

Figure 21:
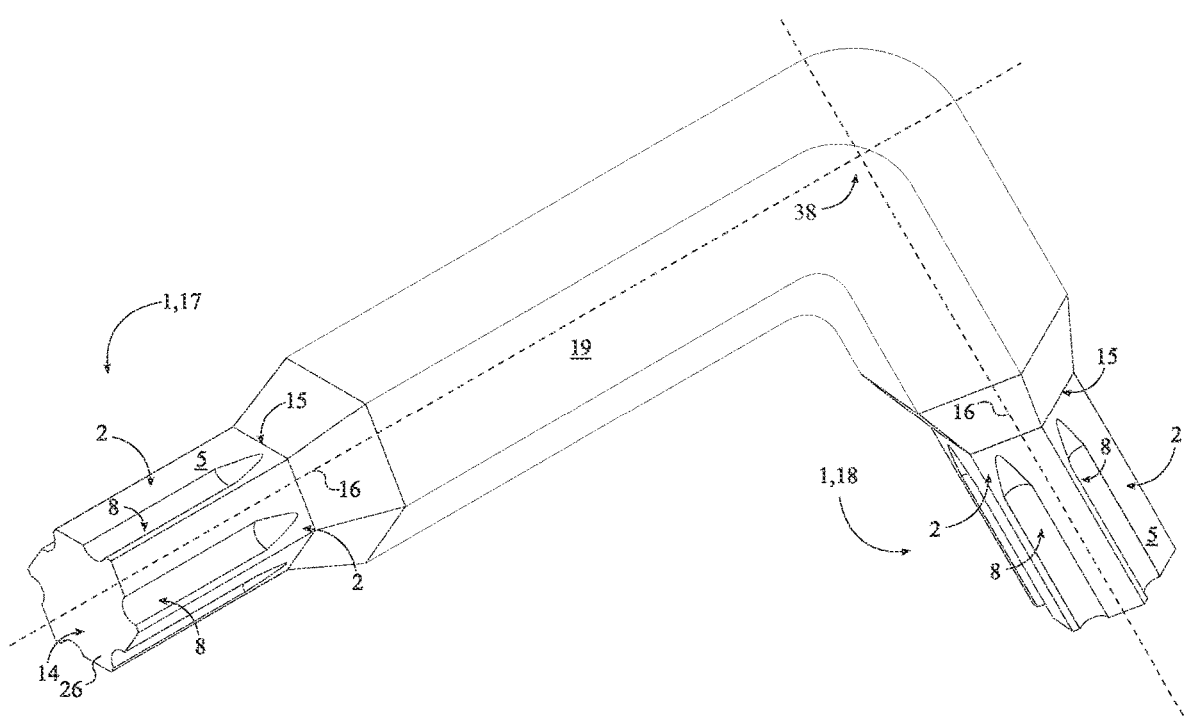
FIG. 21 is a perspective view of another separate alternative embodiment of the present invention in relation to FIG. 2, wherein opposing bit bodies are positioned at an angle to each other.

In a further embodiment, the dual-sided screw bit may benefit from being positioned or oriented with a bend between the first screw bit body 17 and the second screw bit body 18, as is commonly seen in hex keys and similar wrench tools. To this end, the second screw bit body 18 may be oriented at an attachment angle 38 from the first screw bit body 17, as represented in FIG. 21. This arrangement enables the user to utilize the first screw bit body 17 as a handle while turning an external screw with the second screw bit body 18.

In another embodiment of the present invention, referring to FIG. 5, the at least one engagement cavity 8 comprises a first cavity portion 12 and a second cavity portion 13. This embodiment is an alternative configuration which yields a clockwise and counter-clockwise configuration. In particular, the first cavity portion 12 and the second cavity portion 13 are oriented parallel and offset to each other. The first cavity portion 12 is positioned adjacent and offset to the first lateral edge 3 and the second cavity portion 13 is positioned adjacent and offset to the second lateral edge 4. This allows the user to rotate the present invention either in the clockwise or counter-clockwise rotation without removing the present invention from the torque tool while still taking advantage of the additional gripping point(s). The first cavity portion 12 and the second cavity portion 13 may intersect one another or may be offset from one another. An intermediate bracing surface 53 is delineated between the first cavity portion 12 and the second cavity portion 13 or at the intersection of the first cavity portion 12 and the second cavity portion 13. The intermediate bracing surface 53 may be colinear with the bracing surface 5 but need not be colinear. The invention is not limited to a first cavity portion 12 and the second cavity portion 13; in some embodiments, the at least one engagement cavity 8 may comprise more cavity portions in addition to the first cavity portion 12 and the second cavity portion 13. In this embodiment, it is preferred that the present invention further comprises the plurality of intermittent sidewalls 24, wherein the plurality of intermittent sidewalls 24 is interspersed amongst the plurality of laterally-bracing sidewalls 2. As a consequence of this embodiment, the triangular profile may be a plurality of triangular profiles arranged along the plurality of laterally-bracing sidewalls 2. Such an embodiment enables enhanced adaptation to various high-stress uses of the present invention.

Figure 7:
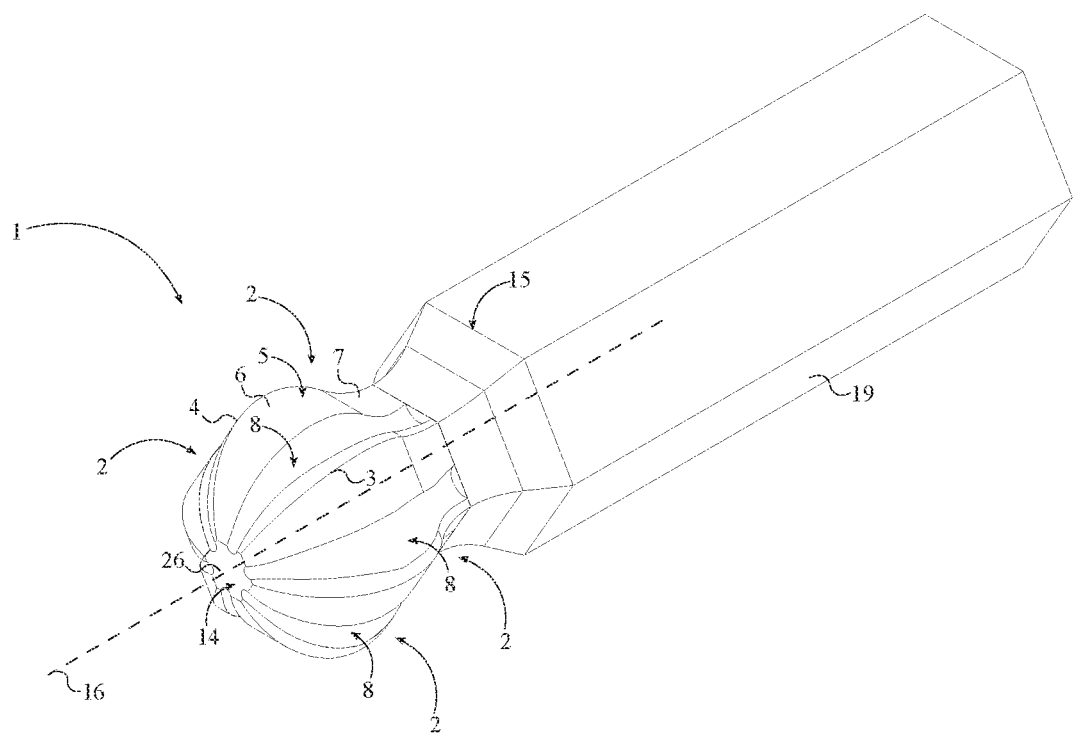
FIG. 7 is a perspective view of an alternative embodiment of the present invention.

Referring to FIG. 7, in an alternative embodiment, the present invention is implemented as a ball-end screw bit. In this embodiment, the bracing surface 5 for each of the plurality of laterally-bracing sidewalls 2 comprises a convex portion 6 and a concave portion 7. The convex portion 6 and the concave portion 7 delineate a curved surface such that, overall, the plurality of laterally-bracing sidewalls 2 forms a ball-like shape. The convex portion 6 is positioned adjacent to the first base 14 such that the convex portion 6 from each of the plurality of laterally-bracing sidewalls 2 forms the body of the ball-like shape. The concave portion 7 is positioned adjacent to the convex portion 6, opposite to the first base 14 such that the concave portion 7 from each of the plurality of laterally-bracing sidewalls 2 further forms the ball-like shape and provides clearance for when the screw bit body 1 is engaged to the socket fastener at an angle. The convex portion 6 and the concave portion 7 are oriented along the rotation axis 16 of the screw bit body 1, and thus the length of the screw bit body 1, to position the ball-like shaped terminally on the screw bit body 1. It is preferred that the curvature, length, and height of the concave portion 7 and the convex portion 6 is identical. Additionally, it is preferred that the engagement cavity 8 extends along the whole length of the convex portion 6 and the concave portion 7. Thus, additional gripping is provided along the screw bit body 1, regardless of the angle between the socket fastener and the screw bit body 1.

Referring to FIG. 10, in one embodiment, the present invention is implemented as a tamper-resistant screw bit. In particular, the present invention further comprises a pin-in security hole 23 which interlocks with a complimentary post within a unique socket fastener. Thus, a set of unique socket fasteners and a unique-key screw bit may be sold, utilized, or manufactured to ensure tamper proof design. This type of interlocking design is used for security reasons, preventing unauthorized personnel from accessing certain socket fasteners. The pin-in security hole 23 is concentrically positioned with the rotation axis 16 of the screw bit body 1. Additionally, the pin-in security hole 23 extends into the screw bit body 1 from the first base 14. The size, depth, and profile of the pin-in security is subject to change to meet the needs and specifications of the user.

Figure 12:
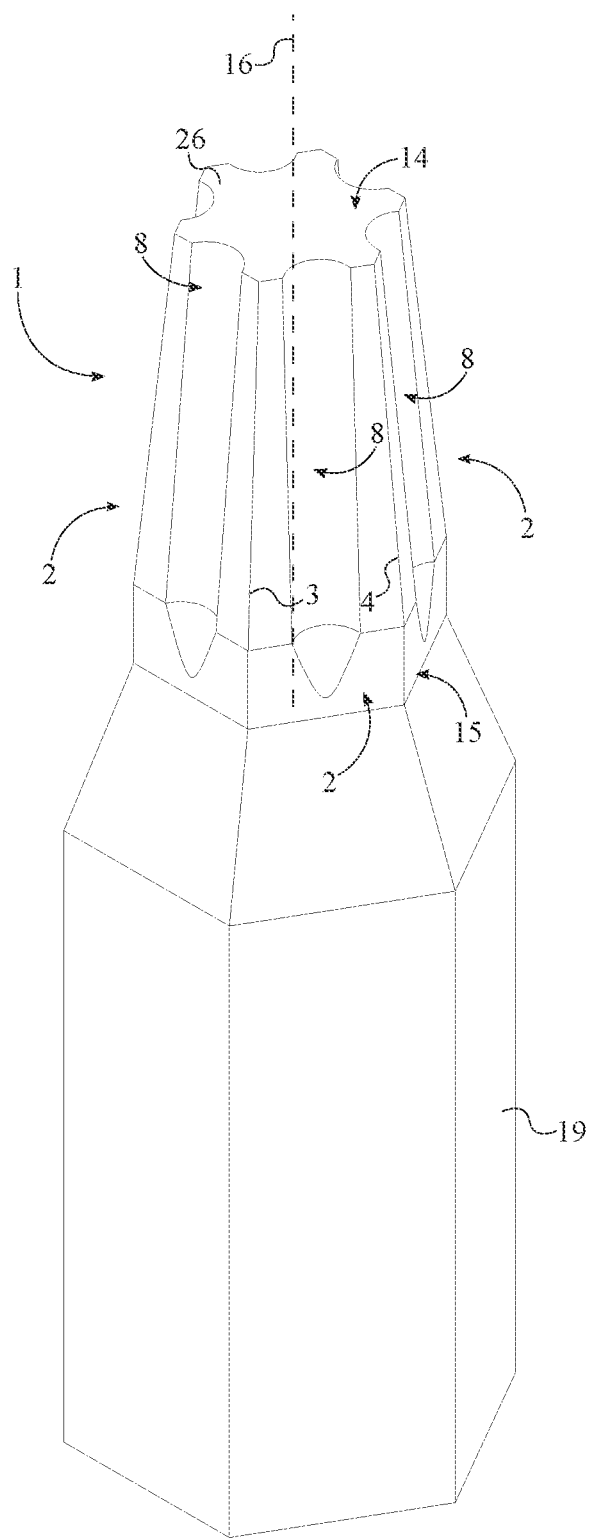
FIG. 12 is a perspective view of an alternative embodiment of the present invention.

In one embodiment, referring to FIG. 11, the present invention includes additional features in order to guide the screw bit body 1 into the socket fastener. In particular, a lateral edge 25 between the first base 14 and each of the plurality of laterally-bracing sidewalls 2 is chamfered which aids the user in interlocking the screw bit body 1 within the socket fastener. Referring to FIG. 12, in another embodiment, the present invention is implemented in an alternative design. In this embodiment, the screw bit body 1 is tapered from the second base 15 towards the first base 14. The degree of tapering is subject to change to meet the needs and requirements of the user. In yet another embodiment as shown in FIG. 22, the present invention is a screw bit body that tapers from the second base 15 to first base 14 including at least one flat sidewall 37 that is tapered adjacent to at least one specific sidewall 36 that is tapered. In other words, the at least one specific sidewall 36 and the at least one flat sidewall 37 are not perpendicular with the first base 14, as shown in FIG. 22. Some embodiments are generally more advantageous for leverage and resistance of mechanical wear during use. To this end, the at least one engagement cavity 8 is positioned offset from the first lateral edge 3 of the at least one specific sidewall 36 by a first distance 21, as shown in FIG. 22. Resultantly, a gripping point is created by the at least one engagement cavity 8 and the bracing surface 5. The first portion 33 of the bracing surface 5 of the at least one specific sidewall 36 may be positioned along the first distance 21. In this way, the first distance 21 may denote area including a segment of the first portion 33. A width distance 35 of the at least one engagement cavity 8 may be positioned parallel to the bracing surface 5. This arrangement allows the width distance 35 to be parallel to the first distance 21. The width distance 35 may be greater than the first distance 21. In this way, the at least one engagement cavity 8 is ensured to span across a significant portion of the useful area for the bracing surface 5.

The first portion 33 of the present invention may take a variety of shapes as may be found to be advantageous under various stresses or use cases. To ensure an appropriate shape of the at least one engagement cavity 8, the first portion 33 may be a shape selected from the group consisting of: straight line, concave, and convex, as shown in FIG. 14-17. Any of these shapes could provide optimal support during use, improving the duration of the present invention.

The bracing surface 5 may further benefit from a more complex shape or arrangement. To enable this, the bracing surface 5 may further comprise a second portion 34, as shown in FIG. 22. The second portion 34 is a section of the bracing surface 5 positioned along a second distance 22, which arranges the second portion 34 adjacent to the second lateral edge 4. The at least one engagement cavity 8 may be positioned offset from the second lateral edge 4 of the at least one specific sidewall 36 by the second distance 22. The second distance 22 denotes the space opposite the first distance 21 between the at least one engagement cavity 8 and the second lateral edge 4. The second portion 34 of the bracing surface 5 of the at least one specific sidewall 36 may be positioned along the second distance 22. In this way, the second distance 22 may denote an area including a segment of the second portion 34. The second portion 34 may be a shape selected from the group consisting of: straight line, concave, and convex. In this way, the second portion 34 may be adapted to best address potential mechanical fatigue to the present invention. Furthermore, the at least one engagement cavity 8 may taper perpendicular to a rotational axis from a position adjacent to the first distance 21 or the second distance 22 towards a lateral edge. This arrangement allows for optimal application of force during rotational usage of the present invention. A length of the first distance 21 may be equal or dissimilar to a length of the second distance 22. A bracing surface geometric plane positioned along the bracing surface 5, adjacent to the at least one engagement cavity 8, is preferably colinear with a lateral edge geometric plane that extends from the first lateral edge 3 to second lateral edge 4; however, in some embodiments, the bracing surface geometric plane may be offset from, rather than colinear with, the lateral edge geometric plane, as shown in FIG. 22. A width distance of the flat sidewall 37 may be less, equal or greater than a width distance of the specific sidewall 36. A width of the first portion 33 and a width of the second portion 34 may taper from the first base 14 to the second base 15. Referring to FIG. 22, in one embodiment of the present invention, the entire cross-section 9 of the engagement cavity 8 is preferably a partially-circular profile. Additionally, the partially-circular profile is concave along a direction from the first lateral edge 3 to the second lateral edge 4. The partially-circular profile ensures that there are little to no high stress points in the screw bit body 1, thus increasing the overall longevity of the tool. In the preferred embodiment, the bracing surface 5 of the at least one specific sidewall 36 is connected to the bracing surface 5 of at least one flat sidewall 37 at an obtuse angle. The attachment body 19 allows the present invention to be attached to an external torque tool, thus allowing torque force to be applied to the socket fastener through the screw bit body 1. The attachment body 19 is centrally positioned around and along a rotation axis 16 of the screw bit body 1 such that the rotation axis of the attachment body 19 and the rotation axis 16 of the screw bit body 1 are coincidentally aligned. Additionally, the attachment body 19 is connected adjacent to the second base 15.

In many circumstances, the user may wish to provide torsional pressure from different angles within an external screw. To provide for this, the second portion 34 of the bracing surface 5 of the at least one specific sidewall 36 may be positioned at a portion angle from the first portion 33 of the bracing surface 5 of the at least one specific sidewall 36, as shown in FIG. 22. This arrangement ensures that alternative shapes of external screw holes may be accurately filled by, and are within the scope of, the present invention.

Figure 23:
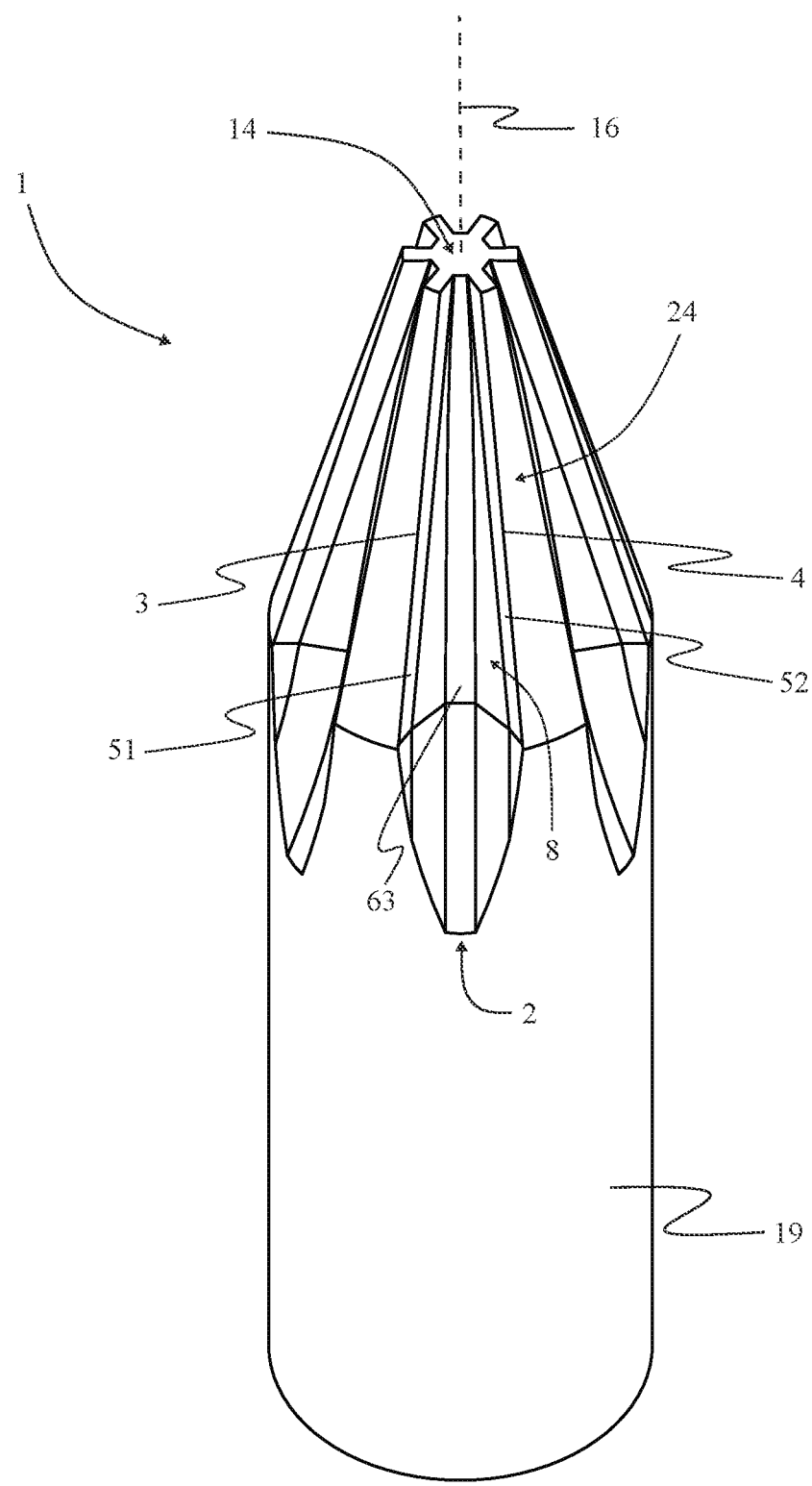
FIG. 23 is a perspective view of a two bracing surface embodiment of the present invention, shown with rounded intermittent sidewalls and angular engagement cavities.
Figure 24:
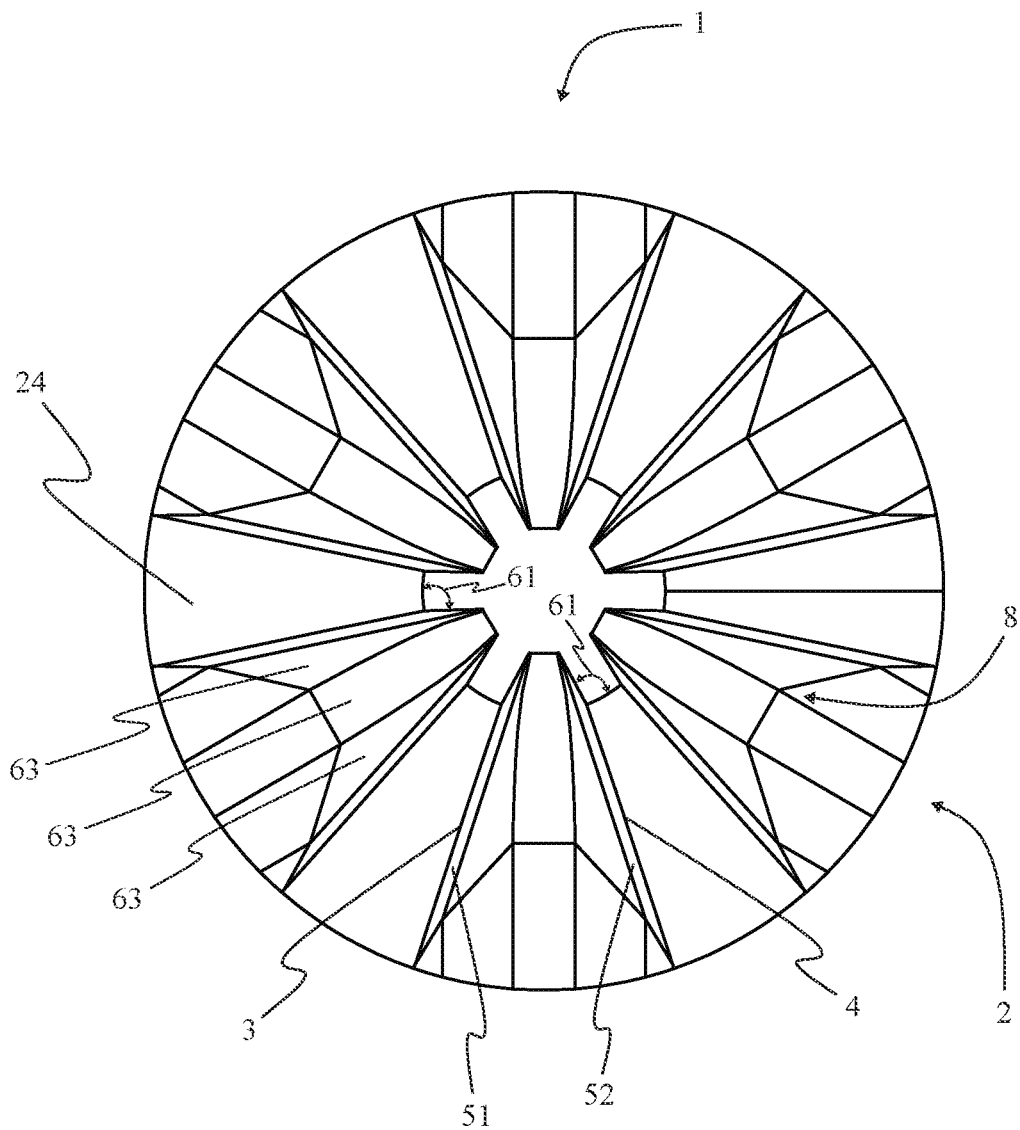
FIG. 24 is a front view of a two bracing surface embodiment of the present invention, shown with rounded intermittent sidewalls and angular engagement cavities.
Figure 25:
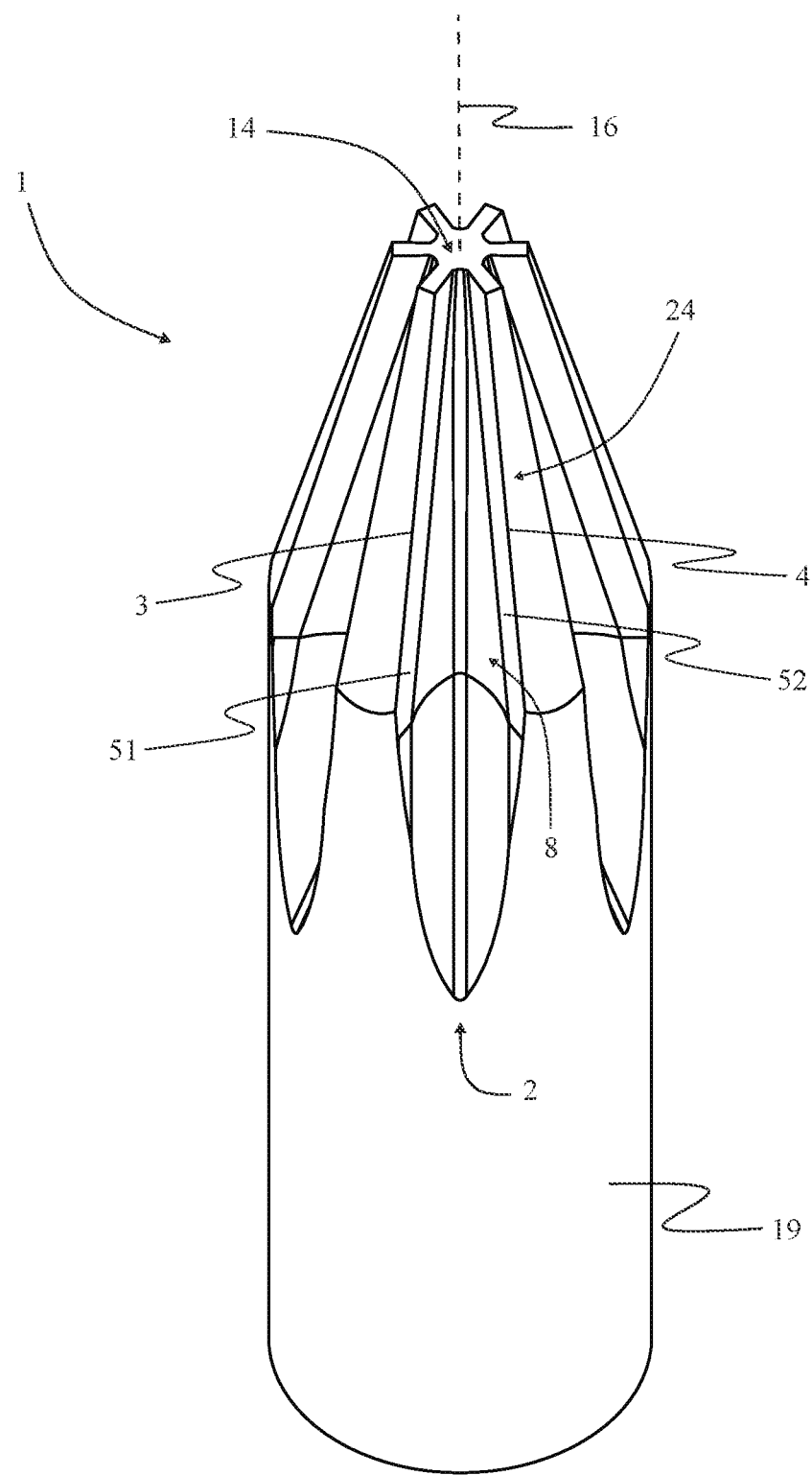
FIG. 25 is a perspective view of a two bracing surface embodiment of the present invention, shown with flat intermittent sidewalls and rounded engagement cavities.
Figure 26:
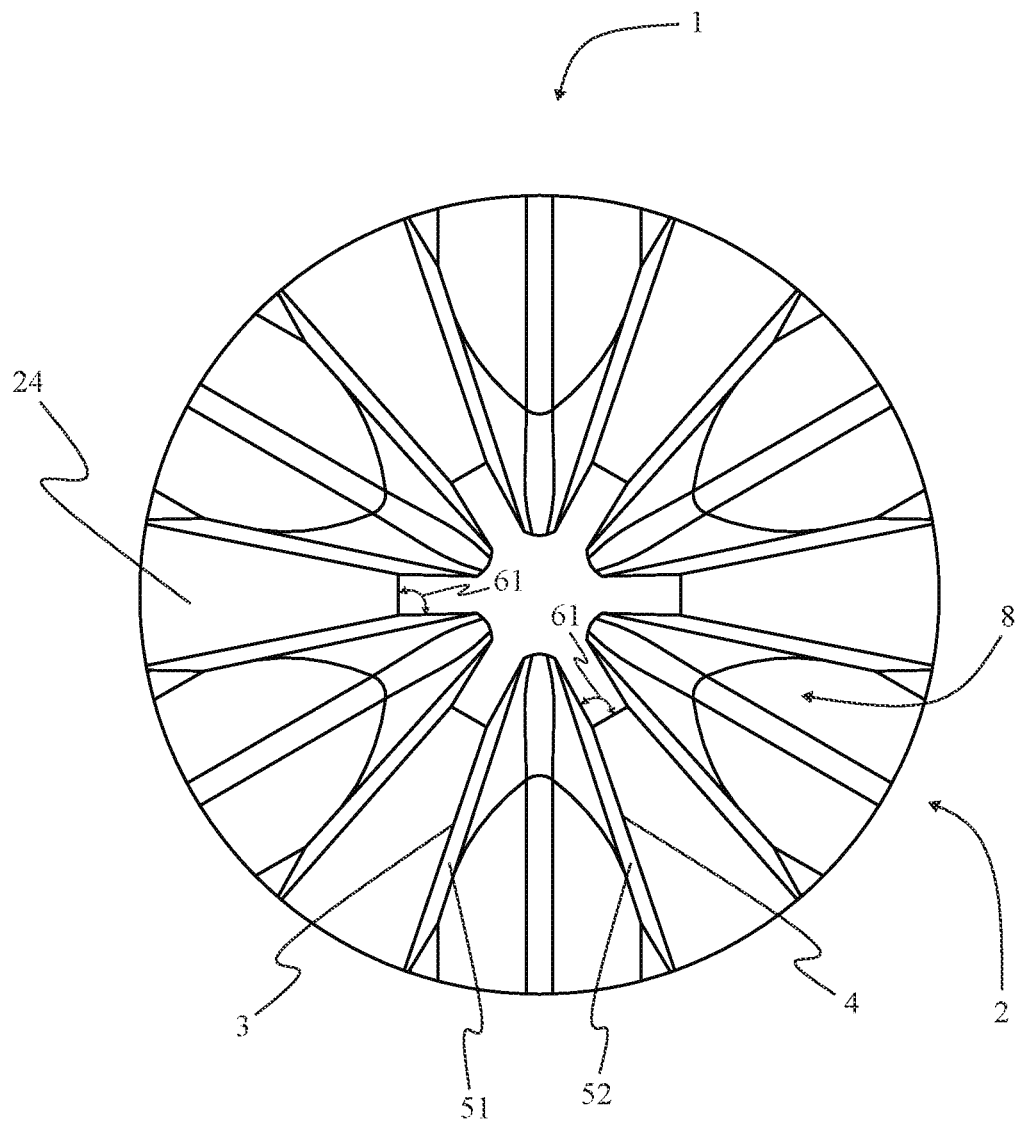
FIG. 26 is a front view of a two bracing surface embodiment of the present invention, shown with flat intermittent sidewalls and rounded engagement cavities.

Similar to previously described embodiments of the present invention, as shown in FIG. 23-26, the advanced holding apparatus comprises at least one screw bit body 1 and an attachment body 19. The at least one screw bit body 1 may comprise a plurality of laterally bracing sidewalls 2, a plurality of intermittent sidewalls 24, a first base 14, and a second base 15. The plurality of laterally bracing sidewalls 2 and plurality of intermittent sidewalls 24 may be radially positioned around the rotation axis 16 of the at least one screw bit body 1 in any number, shown in a six sided configuration in FIG. 23-26. The plurality of laterally bracing sidewalls 2 each comprise a first lateral edge 3, a second lateral edge 4, at least one bracing surface 5, and at least one engagement cavity 8. The first lateral edge 3 and the second lateral edge 4 are positioned at opposite ends of the laterally bracing sidewall 2 with the at least one engagement cavity 8 extending into the at least one screw bit body 1 from the first base 14 to the second base 15. In the preferred embodiment, the at least one engagement cavity 8 is rounded by a single radius or by multiple radii as shown in FIG. 25-26. Referring to FIG. 23-24, the at least one engagement cavity 8 may instead be angular in shape, comprising a plurality of angled sections 63. In the preferred embodiment, the first base 14 is flat, though the first base 14 may be rounded or pointed in alternative embodiments.

Referring to the above-described embodiment, the bracing surface 5 comprises a first bracing surface 51 and a second bracing surface 52. The first bracing surface 51 may be positioned adjacent to the first lateral edge 3 and the second bracing surface 52 may be positioned adjacent to the second lateral edge 4. The at least one engagement cavity 8 may be positioned between the first bracing surface 51 and the second bracing surface 52, the first bracing surface 51 connecting the at least one engagement cavity 8 to the first lateral edge 3 and the second bracing surface 52 connecting the at least one engagement cavity 8 to the second lateral edge 4. The engagement cavity is concave with the first bracing surface 51 and the second bracing surface 52. Unlike many of the previously disclosed embodiments of the present invention, the first bracing surface 51 and the second bracing surface 52 are offset, rather than colinear with one another, with the first lateral edge 3 and the second lateral edge 4 being the points on each of the plurality of laterally bracing sidewalls 2 furthest from the rotational axis 16. A first width distance 64 is measured from the first lateral edge 3 to the second lateral edge 4 across an engagement cavity 8. A second width distance 65 is measured from the first lateral edge 3 to the second lateral edge 4 across an intermittent sidewall 24. In the preferred embodiment, the first width distance 64 is greater than the second width distance 65.

Specifically, the first bracing surface 51 and the second bracing surface 52 are positioned relative to the plurality of intermittent sidewalls 24 by a bracing angle 61. The bracing angle 61 is the interior angle between the first bracing surface 51 or the second bracing surface 52 and one of the plurality of intermittent sidewalls 24 at any cross section 9 parallel to the first base 14 and the second base 15. In cases where the plurality of intermittent sidewalls 24 are convex or concave, the bracing angle 61 is the angle between the first bracing surface 51 or the second bracing surface 52 and an imaginary sidewall plane 62 connecting the first lateral edge 3 and the second lateral edge 4 along a sidewall of the plurality of intermittent sidewalls 24. In the preferred embodiment, the bracing angle 61 is obtuse, though the bracing angle 61 may also be an acute or right angle.

Further in reference to FIG. 23-26, each of the plurality of intermittent sidewalls 24 may be flat, convex, or concave. Similarly, the first bracing surface 51 and the second bracing surface 52 may also be flat, convex, or concave. The first lateral edge 3 and the second lateral edge 4 are angular in shape in the preferred configuration, though they may instead be radial in shape. The first lateral edge 3 and the second lateral edge 4 may have sharp corners or may be rounded. Additionally, in the preferred configuration, the screw bit body 1 is tapered from the first base 14 to the second base 15. This tapering may include tapering by every feature of the screw bit body 1, or by select features of the screw bit body 1. The plurality of intermittent sidewalls 24 may taper diametrically from the first base 14 to the second base 15, wherein a distance from the plurality of intermittent sidewalls 24 to the rotational axis 16 is less at the first base 14 than at the second base 15. The first bracing surface 51, second bracing surface 52, and at least one engagement cavity 8 may each also taper from the first base 14 to the second base 15 collectively or independently. Additionally, the plurality of intermittent sidewalls 24, first bracing surface 51, second bracing surface 52, and at least one engagement cavity 8 may each taper laterally, wherein a width of each feature is smaller at the first base 14 than at the second base 15. Overall, in the preferred configuration, the total diameter of the screw bit body 1 is smaller at the first base 14 than at the second base 15.

As previously noted, the present invention is not limited to a specific number of sidewalls. FIG. 23-26 reference a configuration of the present invention having six laterally bracing sidewalls 2 and six intermittent sidewalls 24, though configurations with other numbers of sidewalls are also acceptable. The four and six sided configurations are the most preferable configurations as they are most suitable for engagement with standard fasteners, though other configurations may be used in accordance with the present invention. However, the number of the plurality of laterally bracing sidewalls 2 and the number of the plurality of intermittent sidewalls 21 preferably match in any configuration.

Figure 27:
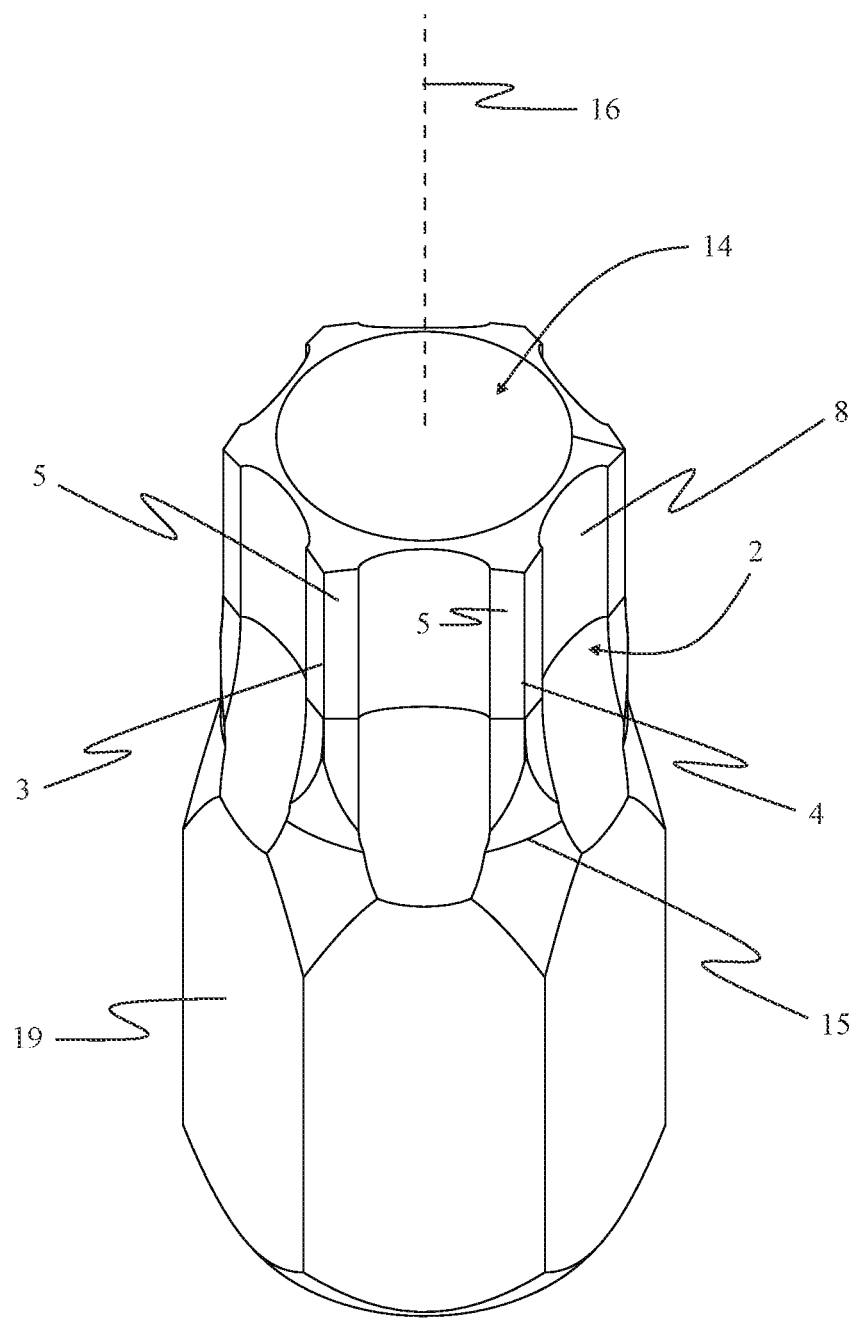
FIG. 27 is a perspective view of an embodiment of the present invention with an elliptic engagement cavity.

In reference to FIG. 27-28, the at least one engagement cavity 8 may be a elliptic semi-elliptic, or partially elliptic in shape. This embodiment positions the at least one engagement cavity 8 the first distance 21 from the first lateral edge 3 and the second distance 22 from the second lateral edge 4 as with previous embodiments. While the preferred configuration of this embodiment includes the first distance 21 and the second distance 22 to be equal in length, the at least one engagement cavity 8 may also be offset from center by having the first distance 21 be greater or less than the second distance 22. Further, the first distance 21 and the second distance 22 of the present invention may not be perfectly equal due to manufacturing limitations. In comparison to a semi-circle profile, the partial or semi-ellipse profile allows for a greater width distance 25 while cutting shallower into the screw bit body 1, leading to greater strength in the screw-bit body 1, especially at and adjacent to the lateral edges. As noted above, the profile of the at least one engagement cavity 8 may also be shaped with straight, angular, and curved portions to create an elongated engagement cavity 8 having similar width and depth properties to the elliptic configuration.

In the preferred configuration of the embodiment shown in FIG. 27-28, the at least one engagement cavity comprises a cavity base 71, a first connecting portion 72, and a second connecting portion 73. The cavity base 71 is connected to the bracing surface 5 on one side by the first connecting portion 72, adjacent to the first lateral edge 3. The cavity base 71 is connected to the bracing surface 5, opposite the first connecting portion 72, by the second connecting portion 73, adjacent to the second lateral edge 4. The first connecting portion 72 and the second connecting portion 73 are preferably concave or flat, allowing fastener material to displace within the at least one cavity 8 when the engagement features bite the fastener, enabling the present invention to achieve greater grip and torque on the fastener without rounding the fastener or slipping off the fastener.

Further in reference to FIG. 27-28, the first lateral edge 3 and the second lateral edge 4 are each sharp corners at the intersection of the bracing surface 5 of an arbitrary laterally bracing sidewall and an adjacent laterally bracing sidewall. An edge angle 70 is measured at the first lateral edge 3 and the second lateral edge 4, being the internal angle between the bracing surface 5 of an arbitrary laterally bracing sidewall and an adjacent laterally bracing sidewall. The edge angle 70 is preferably 120 degrees or 90 degrees, depending on the number of laterally bracing sidewalls, though other angle sizes may be used. Additionally, for each of the plurality of laterally bracing sidewalls 2, the intersection between the first connecting portion 72 and the bracing surface 5 and the second connecting portion 73 and the bracing surface are sharp edges. For each of the sharp corners described above, a minor manufacturing radius may be present while still maintaining the sharp edge.

For the embodiment shown in FIG. 27-28, the at least one engagement cavity 8 may comprise a first cavity portion 12 and a second cavity portion 13. This embodiment is an alternative configuration which maintains a clockwise and counter-clockwise configuration when the at least one engagement cavity 8 is offset from the center of the laterally bracing sidewall 2. In particular, the first cavity portion 12 and the second cavity portion 13 are oriented parallel to each other. The first cavity portion 12 is positioned adjacent and offset to the first lateral edge 3 and the second cavity portion 13 is positioned adjacent and offset to the second lateral edge 4. This allows the user to take advantage of multiple additional gripping points and rotate the present invention either in the clockwise or counter-clockwise direction. The first cavity portion 12 and the second cavity portion 13 may intersect one another or may be offset from one another. An intermediate bracing surface 53 is delineated between the first cavity portion 12 and the second cavity portion 13 or at the intersection of the first cavity portion 12 and the second cavity portion 13. The intermediate bracing surface 53 may be colinear with the bracing surface 5 but need not be colinear. The invention is not limited to a first cavity portion 12 and the second cavity portion 13; in some embodiments, the at least one engagement cavity 8 may comprise more cavity portions in addition to the first cavity portion 12 and the second cavity portion 13.

Figure 29:
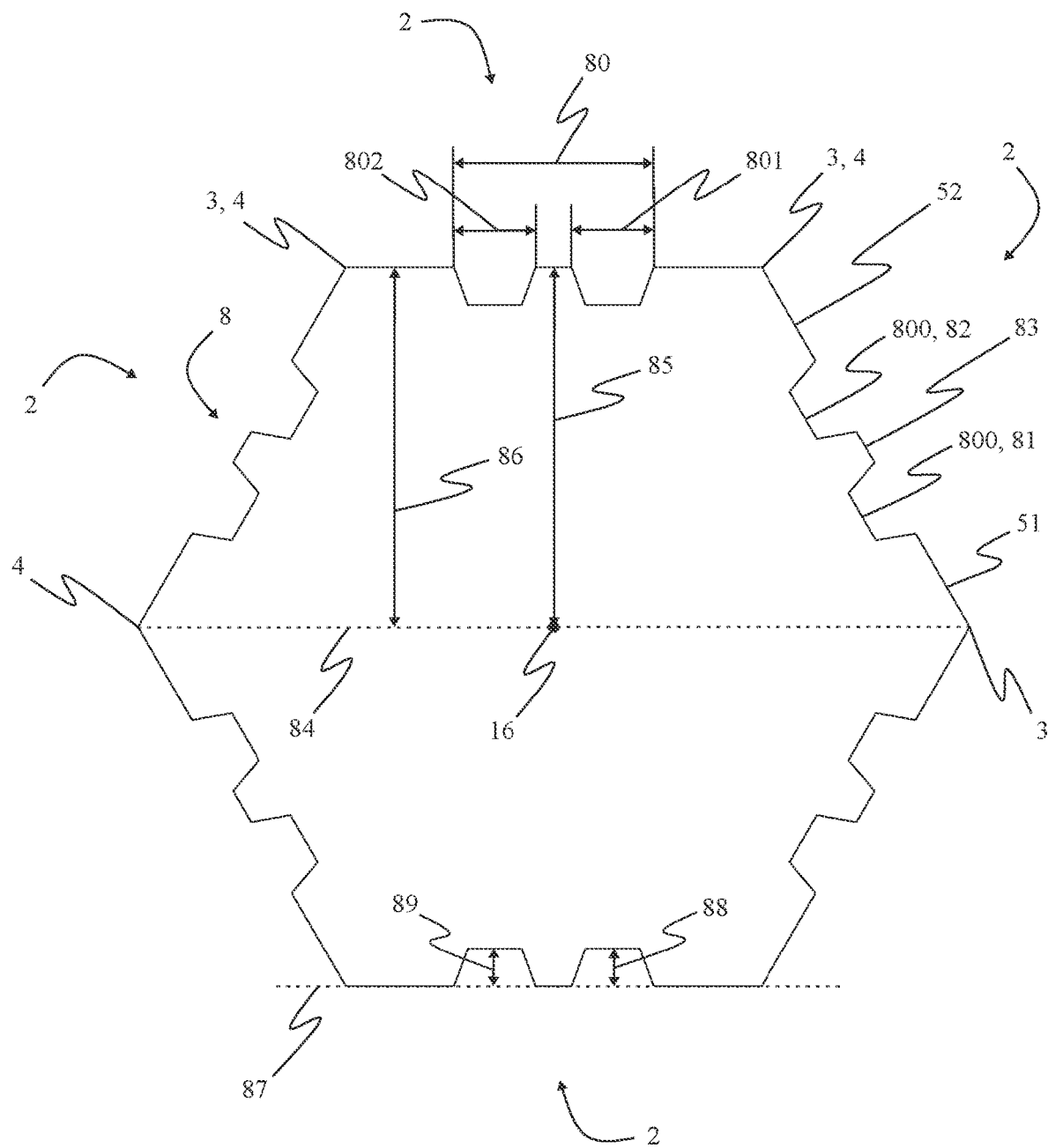
FIG. 29 is a front view of the present invention in accordance with at least one embodiment.
Figure 30:
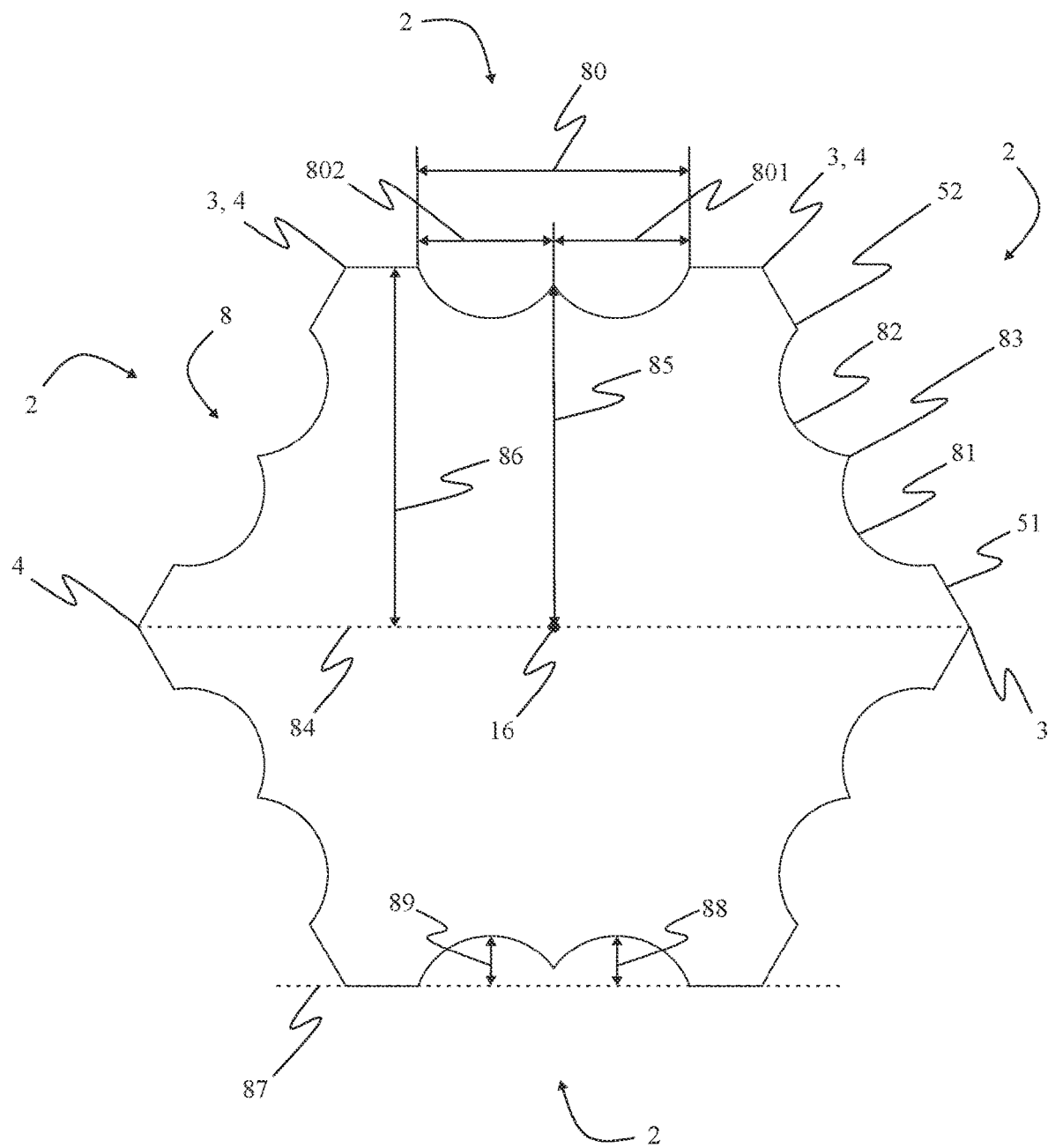
FIG. 30 is a front view of the present invention in accordance with at least one embodiment.
Figure 31:
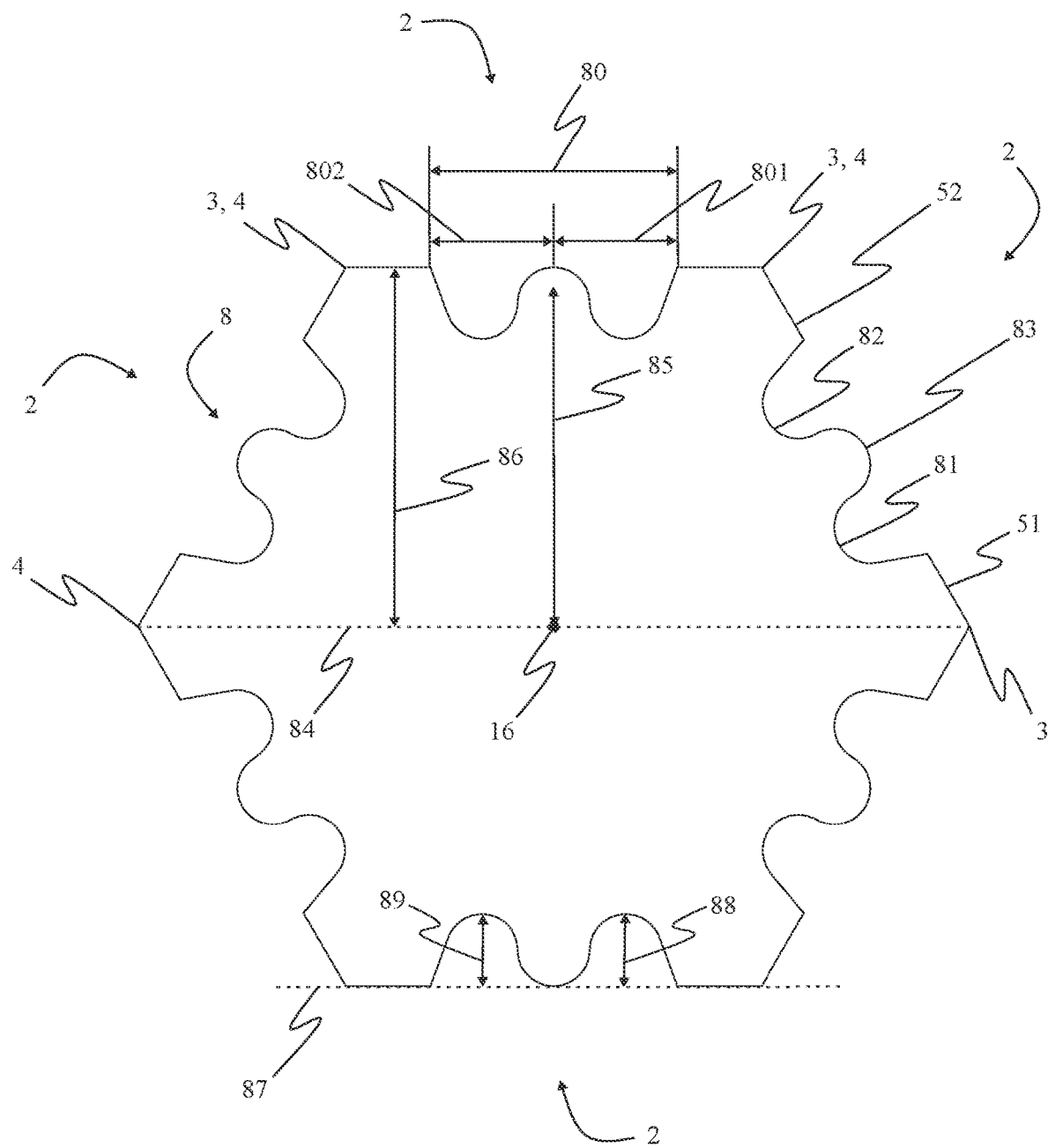
FIG. 31 is a front view of the present invention in accordance with at least one embodiment.

Referring now to FIG. 29-31, the at least one engagement cavity 8 may comprise a plurality of cavity sections 800 and at least one protrusion 83, wherein the at least one protrusion 83 is arranged among the plurality of cavity sections 800. The plurality of cavity sections 800 may be distinguishable from the at least one protrusion 83 within the at least one engagement cavity 8 in that the plurality of cavity sections 800 is concave while the at least protrusion 83 is convex. In the preferred embodiment, the plurality of cavity sections 800 comprises a first cavity portion 81 and a second cavity portion 82, wherein the at least one protrusion 83 is arranged between the first cavity section 81 and the second cavity section 82. The at least one protrusion 83 provides the benefit of additional strength to the screw bit body 1. It is well known that adding mass or material as in the case of the protrusion will increase the strength to the screw bit body 1. Additionally, the at least one protrusion 83 within the at least one engagement cavity 8 will prevent the user from mistakenly using the present invention of FIGS. 29-31 with the incorrect fastener. As an example, a Torx fasteners also known as a Star fastener or Torx plus fastener also known as a Star Plus fastener. The present invention of FIGS. 29-31 is designed for use in a hexagonal socket fastener, using the present invention in an incorrect fastener would causes damage to both the fastener and the tool negating the benefits of the anti-slip griping segments of the present invention as described herein. Adding the at least one protrusion 83 to the at least one engagement cavity 8 corrects a common problem whereby incorrect tools are used on non-matching Hexalobular fasteners. As described in previous embodiments, the first bracing surface 51 may be positioned adjacent to the first lateral edge 3 and the second bracing surface 52 may be positioned adjacent to the second lateral edge 4. The first lateral edge 3 and the second lateral edge 4 may be sharp, rounded, or blunt. The at least one engagement cavity 8, comprising the first cavity portion 81, the second cavity portion 82, and the at least one protrusion 83, may be positioned between the first bracing surface 51 and the second bracing surface 52. The at least one engagement cavity 8 is not limited to only a first cavity portion 81 and a second cavity portion 82 but may instead include any number of cavity portions. Similarly, in the preferred embodiment the at least one protrusion 83 comprises only a single protrusion, but multiple protrusions may be included within the scope of the invention. In the preferred embodiment, the at least one protrusion 83 is arranged between the first cavity portion 81 and the second cavity portion 82, the first cavity portion 81 is arranged adjacent to the first bracing surface 51, opposite the first lateral edge 3, and the second cavity portion 82 is arranged adjacent to the second bracing surface 52, opposite the second lateral edge 4. The profiles of the first cavity portion 81 and the second cavity portion 82 may be rounded or angular in shape, including, but not limited to, a partially-circular, triangular, or rectangular shape or a combination of angular and radial shapes. Additionally, the shape of each portion of the at least one engagement cavity 8 can be a shape from a group consisting of, straight line, and or concave, and/or convex if preferred. The combination or singular use of these shapes could further improve the longevity, safety, and functionality of the present invention in certain applications as determined by the user. Similarly, the at least one protrusion 83 may be rounded, pointed, flat, or a shape from a group consisting of, straight line, and/or concave, and/or convex, used individually or in combination, if preferred.

A midplane 84 for each of the plurality of laterally-bracing sidewalls 2 may be delineated at any cross section 9 parallel to the first base 14 and the second base 15. The midplane 84 is a reference plane positioned parallel to the first bracing surface 51 and passing through the rotation axis 16. A protrusion distance 85 may be defined as the greatest distance between the at least one protrusion 83 and the midplane 84 perpendicular to the midplane. A bracing distance 86 may be defined as the shortest distance between the first bracing surface 51 and the midplane 85. In the preferred embodiment, the protrusion distance 85 is less than the bracing distance 86. However, in alternative embodiments, the protrusion distance 85 may be equal to the bracing distance 86 or the protrusion distance 85 may be greater than the bracing distance 86.

Further, a bracing plane 87 may be delineated parallel to the first bracing surface 51 and perpendicular to the first base 14. A first cavity depth 88 may be defined as the greatest distance from the bracing plane 87 to the first cavity portion 81, parallel to the bracing plane 87. A second cavity depth 89 may be defined as the greatest distance from the bracing plane to the second cavity portion 82, parallel to the bracing plane 87. Further, a cavity length 80 may be defined as the shortest distance from the first bracing surface 51 to the second bracing surface 52, across the at least one cavity 8. Additionally, a first cavity length 801 may be defined as the shortest distance from the first bracing surface 51 to the protrusion 83 across the first cavity section 81 and a second cavity length 802 may be defined as the shortest distance from the second bracing surface 52 to the protrusion 83 across the second cavity section 82. In the preferred embodiment, the cavity length 80 is greater than the first cavity depth 88 and the cavity length 80 is greater than the second cavity depth 89. In some embodiments, the first cavity length 801 may be shorter, longer, or equal to the first cavity depth 88 and the second cavity length 802 may be shorter longer, or equal to the second cavity depth 89. The first cavity depth 88 is preferably equal to the second cavity depth 89, though in some embodiments, the first cavity depth 88 may be greater or less than the second cavity depth 89.

Referring to FIG. 29-31, similar to the above-discussed embodiments, the screw bit body 1 may further comprise a plurality of intermittent sidewalls 24. Each of the plurality of intermittent sidewalls 24 is a flat surface which engages the socket fastener like a traditional screw bit design. The plurality of intermittent sidewalls 24 is radially positioned about the rotation axis 16. Additionally, the plurality of intermittent sidewalls 24 is interspersed amongst the plurality of laterally-bracing sidewalls 2. The ratio between the plurality of laterally-bracing sidewalls 2 and the plurality of intermittent sidewalls 24 is subject to change to yield a variety of different screw bit designs. In one embodiment, the plurality of intermittent sidewalls 24 and the plurality of laterally-bracing sidewalls 2 radially alternate between each other. In another embodiment, there are three sidewalls from the plurality of intermittent sidewalls 24 in between each of the plurality of laterally-bracing sidewalls 2. Resultantly, this configuration places an engagement feature/tooth at every other protrusion of the screw bit body 1.

In other embodiments, the present invention may be implemented in the form of a socket for tightening or loosening of bolts and other similar fasteners. For this, the screw bit body 1 is implemented as a cavity traversing into a cylinder, similar to traditional socket designs.

Although the invention has been explained in relation to its preferred embodiment, it is to be understood that many other possible modifications and variations can be made without departing from the spirit and scope of the invention as hereinafter claimed.

What is claimed is:
1. An advanced holding apparatus, comprising:
at least one screw bit body;
the at least one screw bit body being a fully enclosed solid;
the at least one screw bit body comprising a plurality of laterally bracing sidewalls;
the plurality of laterally bracing sidewalls each comprising a first lateral edge, a second lateral edge, a first bracing surface, a second bracing surface, and at least one engagement cavity;
the plurality of laterally bracing sidewalls being radially positioned about a rotation axis of the at least one screw bit body;
the first lateral edge and the second lateral edge being positioned opposite one another about the respective laterally bracing sidewall;
the at least one engagement cavity extending normal and into the screw bit body;
the at least one engagement cavity comprising a plurality of cavity sections and at least one protrusion, wherein each of the plurality of cavity sections is concave and the at least one protrusion is convex;
the at least one protrusion being arranged among the plurality of cavity sections;
the plurality of cavity sections comprising a first cavity section and a second cavity section;
the first cavity section being offset from the second cavity section by the at least one protrusion;
an imaginary bracing plane extending parallel to the first bracing surface;
a first cavity depth being the greatest distance from the imaginary bracing plane to the first cavity section, perpendicular to the imaginary bracing plane;
a second cavity depth being the greatest distance from the imaginary bracing plane to the second cavity section, perpendicular to the imaginary bracing plane;
a first cavity length being the shortest distance from the first bracing surface to the at least one protrusion across the first cavity section;
a second cavity length being the shortest distance from the second bracing surface to the at least one protrusion across the second cavity section;
the first cavity depth being greater than the second cavity depth or the second cavity depth being greater than the first cavity depth; and
the first cavity length is longer or shorter than the second cavity length.

2. The advanced holding apparatus of claim 1, further comprising:
a midplane for each of the plurality of laterally bracing sidewalls being positioned on a cross section of the at least one screw bit body;
the midplane being parallel to the first bracing surface;
the midplane passing through the rotation axis;
a protrusion distance being the greatest distance between the protrusion and the midplane, perpendicular to the midplane; and
a bracing distance being the shortest distance between the first bracing surface and the midplane.

3. The advanced holding apparatus of claim 2, wherein the protrusion distance is equal to the bracing distance.

4. The advanced holding apparatus of claim 2, wherein the protrusion distance is greater than the bracing distance.

5. The advanced holding apparatus of claim 2, wherein the protrusion distance is less than the bracing distance.

6. The advanced holding apparatus of claim 1, wherein the plurality of cavity sections is rounded in shape.

7. The advanced holding apparatus of claim 1, wherein the plurality of cavity sections is angular in shape.

8. The advanced holding apparatus of claim 1, wherein the at least one protrusion is rounded.

9. The advanced holding apparatus of claim 1, wherein the at least one protrusion is pointed.

10. The advanced holding apparatus of claim 1, wherein the at least one protrusion is flat.

11. The advanced holding apparatus of claim 1, wherein the at least one protrusion is arranged between the first cavity section and the second cavity section.

12. The advanced holding apparatus of claim 11, further comprising:
the first bracing surface being positioned adjacent to the first lateral edge;
the first cavity section being positioned adjacent to the first bracing surface opposite the first lateral edge;
the second bracing surface being positioned adjacent to the second lateral edge; and
the second cavity section being positioned adjacent to the second bracing surface, opposite the second lateral edge.

13. The advanced holding apparatus of claim 1, further comprising:
a plurality of intermittent sidewalls;
the plurality of intermittent sidewalls being radially positioned about the rotation axis of the at least one screw bit body; and
the plurality of intermittent sidewalls being interspersed among the plurality of laterally bracing sidewalls.

14. The advanced holding apparatus of claim 13, wherein the each of the plurality of intermittent sidewalls is flat.

15. The advanced holding apparatus of claim 1, wherein the first bracing surface and the second bracing surface are parallel to one another.

* * * * *